(12) United States Patent
Takagi

(10) Patent No.: US 9,505,187 B2
(45) Date of Patent: Nov. 29, 2016

(54) METHOD FOR PRODUCING AN OPTICAL COMPENSATING RESIN FILM FOR A POLARIZING PLATE

(71) Applicant: KONICA MINOLTA, INC., Tokyo (JP)

(72) Inventor: Takahiro Takagi, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 387 days.

(21) Appl. No.: 14/095,069

(22) Filed: Dec. 3, 2013

(65) Prior Publication Data

US 2014/0103551 A1 Apr. 17, 2014

Related U.S. Application Data

(62) Division of application No. 12/226,241, filed as application No. PCT/JP2007/058435 on Apr. 18, 2007, now abandoned.

(30) Foreign Application Priority Data

Apr. 26, 2006 (JP) .................................. 2006-121819

(51) Int. Cl.
| | | |
|---|---|---|
| *B29D 11/00* | (2006.01) | |
| *B29C 55/06* | (2006.01) | |
| *B29C 55/08* | (2006.01) | |
| *B29C 55/14* | (2006.01) | |
| *C08K 5/103* | (2006.01) | |

(Continued)

(52) U.S. Cl.
CPC ....... *B29D 11/00788* (2013.01); *B29C 55/065* (2013.01); *B29C 55/085* (2013.01); *B29C 55/143* (2013.01); *B29C 55/146* (2013.01); *C08K 5/103* (2013.01); *C08L 1/10* (2013.01); *G02B 5/3033* (2013.01); *G02B 5/3083* (2013.01); *B29K 2995/0034* (2013.01)

(58) Field of Classification Search
CPC . B29C 55/065; B29C 55/085; B29C 55/143; B29C 55/146; B29D 11/00788; G02B 5/3033; G02B 5/3083; C08K 5/103; C08L 1/10
See application file for complete search history.

(56) References Cited

U.S. PATENT DOCUMENTS

| 6,261,664 B1 | 7/2001 | Beeson et al. |
| 6,392,035 B1 | 5/2002 | Karstens et al. |
| 2006/0082022 A1 | 4/2006 | Denker et al. |

(Continued)

FOREIGN PATENT DOCUMENTS

| JP | 06-222213 A | 8/1994 |
| JP | 2002-267847 A | 9/2002 |

(Continued)

OTHER PUBLICATIONS

International Search Report mailed Jul. 17, 2007 for PCT/JP2007/058435.

*Primary Examiner* — Mathieu Vargot
(74) *Attorney, Agent, or Firm* — Holtz, Holtz & Volek PC

(57) ABSTRACT

A method of producing an optical compensating resin film for a polarizing plate including casting a resin exhibiting a glass transition temperature of 150 to 200° C. determined via DSC via a solution casting to form a film; peeling the formed film; conveying the film at a temperature of 60° C. or less for at least 90 seconds; and stretching the film.

18 Claims, 2 Drawing Sheets

(51) Int. Cl.
    *C08L 1/10*    (2006.01)
    *G02B 5/30*    (2006.01)

(56) References Cited

U.S. PATENT DOCUMENTS

2006/0246232 A1* 11/2006 Kubo ................. G02B 5/305
                                                    428/1.31
2006/0275560 A1  12/2006 Fukagawa et al.

FOREIGN PATENT DOCUMENTS

| | | |
|---|---|---|
| JP | 2004-004550 A | 1/2004 |
| JP | 2004-279331 A | 10/2004 |
| JP | 2005-272756 A | 10/2005 |
| JP | 2006-071875 A | 3/2006 |
| JP | 2006-335842 A | 12/2006 |

* cited by examiner

METHOD FOR PRODUCING AN OPTICAL COMPENSATING RESIN FILM FOR A POLARIZING PLATE

CROSS-REFERENCE TO RELATED APPLICATIONS

This application is a divisional application of application Ser. No. 12/226,241 filed Oct. 10, 2008 (abandoned), which is the United States national phase application of International application PCT/JP2007/058435 filed Apr. 18, 2007. The entire contents of each of application Ser. No. 12/226, 241 and International application PCT/JP2007/058435 are hereby incorporated by reference herein.

TECHNICAL FIELD

The present invention relates to an optical compensating resin film for polarizing plates, an polarizing plate, and a liquid crystal display device, and in more detail to an optical compensating resin film for polarizing plates, which minimizes light leakage due to light scattering to improve image contrast and a polarizing plate employing the aforesaid optical compensating resin film, which exhibits high contrast and excellent smoothness without color non-uniformity, and a liquid crystal display device.

BACKGROUND ART

In recent years, thin and lightweight notebook computers as well as large screen TVs have increasingly been developed. Along with the above, a decrease in thickness, an increase in size, and higher performance have increasingly been sought for polarizing plate protective films employed in display devices such as a liquid crystal display device. Of these, heretofore, liquid crystal display devices have had a problem of narrow view angle. In order to increase the view angle of liquid crystal display devices, a method is proposed in which an optical compensating resin film is employed (refer, for example, to Patent Document 1).

Further, employed in current polarizing plates is a cellulose ester film as a protective film, which has a problem in which its retardation value reversibly varies depending on humidity. Consequently, it is proposed that the above variation is reduced by changing plasticizers and regulating film thickness (refer, for example, to Patent Document 2).

Further, display changes due to the view angle, especially color changes, have caused problems, whereby improvements have been proposed in which rodlike compounds are newly introduced (refer, for example, to Patent Documents 3 and 4).

By employing the above means, it is possible to reduce display changes and color variation, however its level of contrast has still been insufficient. Consequently, technical means to overcome this drawback have been sought.

Patent Document 1: Japanese Patent Publication Open to Public Inspection (hereinafter referred to as JP-A) No. 6-222213
Patent Document 2: Japanese Patent Application No. 2005-161095
Patent Document 3: JP-A No. 2002-267847
Patent Document 4: JP-A No. 2004-4550

DISCLOSURE OF THE INVENTION

Problems to be Solved by the Invention

Accordingly, an object of the present invention is to provide an optical compensating resin film for polarizing plates, in which the displayed image contrast is improved, a polarizing plate employing the above optical compensating resin film, which exhibits excellent smoothness without color non-uniformity, and a liquid crystal display device.

Means to Solve the Problems

The above object of the present invention was achieved via the following embodiments.

1. An optical compensating resin film for a polarizing plate, wherein Ro, defined by the following formula, is 20-300 nm at 23° C. and 55% relative humidity, or Rt, defined by the following formula, is 70-400 nm at 23° C. and 55 relative humidity, and a crystallinity degree of the aforesaid resin film is 0.15 or less:

$$Ro=(nx-ny)\times d$$

$$Rt=((nx+ny)/2-nz)\times d$$

wherein nx, ny, and nz each respectively represents the refractive index in the major axis x, y, and z direction of a refractive index ellipsoid, nx and ny each represents the refractive index in the in-plane direction of the aforesaid resin film, nz represents the refractive index in the thickness direction, and d represents the film thickness (nm).

2. An optical compensating resin film for a polarizing plate, wherein a resin employed in the optical compensating resin film for a polarizing plate, described in 1. above is cellulose ester.

3. An optical compensating resin film for a polarizing plate, wherein the resin employed in the optical compensating resin film for a polarizing plate, described in 2. above is a cellulose ester, the aforesaid cellulose ester has an acyl group having 2-4 carbon atoms and simultaneously satisfies the following Formulas (I) and (II):

$$2.1 \le X+Y \le 2.6 \quad (I)$$

$$1.0 \le X \le 2.6 \quad (II)$$

wherein X represents the substitution degree of an acetyl group, and Y represents the substitution degree of a propionyl group or a butyryl group.

4. An optical compensating resin film for a polarizing plate described in 3. above, wherein the aforesaid cellulose ester is cellulose acetate propionate.

5. An optical compensating resin film for s polarizing plate, described in 4. above, wherein the aforesaid cellulose acetate propionate satisfies following Formulas (III) and (IV):

$$1.0 \le X \le 2.0 \quad (III)$$

$$0.5 \le Y \le 1.3 \quad (IV)$$

6. An optical compensating resin film for s polarizing plate, described in 2. above, further incorporating one of plasticizers, and at least one of the aforesaid plasticizers is an aromatic terminal ester based plasticizer represented by following Formula (1).

$$B\text{-}(G\text{-}A)n\text{-}G\text{-}B \quad \text{Formula (1)}$$

wherein B represents a benzene monocarboxylic acid residual group; G represents an alkylene glycol residual group having 2-12 carbon atoms, an aryl glycol residual group having 6-12 carbon atoms, or an oxyalkylene glycol residual group having 4-12 carbon atoms; A represents an alkylene dicarboxylic acid residual group having 4-12 carbon atoms or an aryl dicarboxylic acid residual group having 6-12 carbon atoms; and n represents an integer of 1 or more.

7. A manufacturing method of the optical compensating resin film for a polarizing plate, described in any one of 1.-6. above, wherein the resin exhibits a glass transition temperature of 170-185° C., which is determined via DSC, is subjected to solution casting; after peeling, the film is conveyed for at least 90 seconds in an ambience of 55° C. or less, and thereafter stretched.
8. A polarizing plate comprising the optical compensating resin film, described in any one of 1.-6. above, at lest on one side of the polarizing plate.
9. A liquid crystal display device comprising the polarizing plate of claim 8 on at least one side of the liquid crystal cell.

Effects of the Invention

According to the present invention, it is possible to provide an optical compensating resin film which results in improved contrast of displayed images, a polarizing plate, employing the aforesaid optical compensating resin film, which exhibits excellent smoothness without color non-uniformity, and a liquid crystal display device.

PREFERRED EMBODIMENTS TO CARRY OUT THE INVENTION

Figure 1:
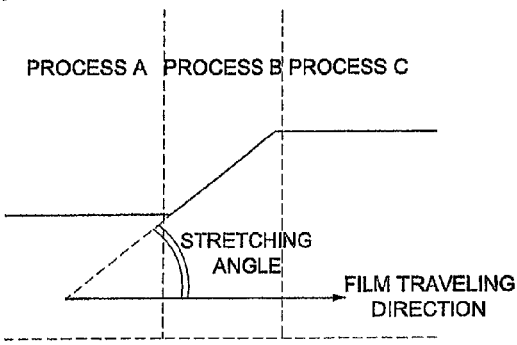
FIG. 1 is a view showing stretching angle in the stretching process.

The optimal embodiment to practice the present invention will now be detailed, however the present invention is not limited thereto.

The present invention enables preparation of an optical compensating resin film which minimizes light leakage due to light scattering and results in improved contrast of displayed images by employing an optical compensating resin film characterized in that the crystallinity degree is 0.15 or less, as well as a polarizing plate which exhibits excellent smoothness without color non-uniformity by employing the same, and a liquid crystal display device.

The present invention will now be detailed.
(Crystallinity Degree of Optical Compensating Resin Film)

Crystallinity degree of film may be increased via various methods. For example, crystallization progresses via a treatment (drying) in the state of a high volume of residual solvents. Accordingly, in order to progress crystallization, as described in JP-A No. 2005-206696, during film manufacture, immediately after peeling film from a belt or a drum, the resulting film is dried at a relatively high temperature, whereby crystallinity degree tends to increase.

The inventors of the present invention conducted diligent investigations with regard to the optical compensating resin film which enabled improvement of the contrast of displayed images. As a result, it was discovered that by regulating the crystallinity degree of an optical compensating resin film to 0.15 or less, light leakage was reduced, and further by employing the aforesaid optical compensating resin film as a polarizing plate film, it was possible to improve handling property during production of polarizing plates, color non-uniformity, and visibility, and further to improve the contrast of displayed images.

During production of the aforesaid optical compensating resin film, methods to regulate the crystallinity degree of the aforesaid film include the following. For example, immediately after peeling film from the belt or drum, it is possible to retard crystallization via conveyance at a relatively low temperature. For example, when a resin film is produced by solution-casting resins which exhibit a glass transition temperature of 170-185° C., determined by DSC, by arranging a process which conveys the film after peeling at an ambience of at most 55° C. for at least 90 seconds, it is possible to regulate the crystallinity degree to 0.15 or less. Further, by regulating the temperature during stretching of the resin film, it is possible to regulate the crystallinity degree. For example, during stretching, by arranging a stretching process at a temperature of not more than the Tg of the resin −10° C. or not less than the Tg of the resin +10° C., it is possible to lower the resulting crystallinity degree.

Further, the decrease in the crystallinity degree during drying is affected via the residual solvent amount, and the effective residual solvent amount differs depending on the combination of solvent types. For example, in the case of a methylene chloride/ethanol solvent solution system, the weight ratio of the above mixed solvents, with respect to the film immediately after peeling, is preferably 70-150%, is more preferably 70-120%, but is most preferably 70-100%. An ethanol mixing ratio is preferably at least 10%, but is more preferably at least 12%.

The residual solvent amount is defined by the following formula.

Residual solvent amount=((weight prior to the heating treatment−weight after the heating treatment)/(weight after the heating treatment))×100 (%)

Incidentally, the heating treatment during determination of the residual solvent amount refers to one in which film is subjected to heating at 115° C. for one hour.

The temperature during conveyance immediately after peeling is preferably at most 60° C., but is more preferably at most 55° C. When the temperature exceeds 60° C., orientation is enhanced in the conveying direction, whereby crystallinity degree increases. The conveying duration prior to stretching is preferably at least 90 seconds. When it is at most 90 seconds, orientation due to residual solvents is enhanced, whereby occasionally, the crystallinity degree increases.

In view of a decrease in light leakage (an improvement of contrast of a liquid crystal display device), it is essential that the crystallinity degree of the optical compensating resin film is at most 0.15. When it is at least 0.15, light leakage increases, resulting in a decrease in contrast of liquid crystal display devices.

It is possible to calculate the crystallinity degree via the method described below.
(Calculation Method of Crystallinity Degree)

X-ray diffraction intensity is determined under the following conditions, and crystallinity degree CrI was calculated based on Scheme (1).

Diffraction peak intensity differs depending on resins. However, calculation may be made by subtracting the base line intensity from the peak intensity of each of the spectra.

$$CrI=(I8-I18)/I8 \qquad \text{Scheme (1)}$$

wherein I8 represents the diffraction peak intensity of 2θ=8°, while I18 represents the diffraction peak of 2θ=18°.

X-ray generating apparatus: RINT TTR2, produced by Rigaku Corp.
X-ray source: CuKα
Output: 50 kV/300 mA
1st slit: 0.04 mm
2nd slit: 0.03 mm
Light receiving slit: 0.1 mm
<Data Recorder>
2θ/θ: continuous scanning
Measured range: 2θ=2-45°
Sampling: 0.02°
Integrated time: 1.2 seconds (Glass Transition Temperature)

In view of optical and mechanical characteristics of optical compensating resin films, the glass transition temperature of resins employed in the optical compensating resin film of the present invention is commonly 150-200° C., but is preferably 170-185° C. When it is in the range of 170-185° C., the resulting optical compensating resin film excels in optical and mechanical characteristics. Glass transition temperature in the present invention refers to the value determined via a differential scanning calorimeter (RDC220, produced by Seiko Instruments Inc.) under a temperature increasing condition of 10° C./minute, or the value determined via a comparable method.

Glass transition temperature will now be briefly described.

"Glass transition temperature" (hereinafter also referred to as a glass transition point), as described herein, refers to the temperature at which glass transition occurs in a non-crystalline solid material, and is commonly designated as Tg.

A high polymer compound includes a crystalline portion (where molecules are closely positioned) and non-crystalline portion (where molecules are not closely positioned). The non-crystalline portion is flexible, while the bond in the crystalline portion is rigid. However, at a relatively low temperature, molecular movement of the non-crystalline portion is retarded, whereby a glass-like state is formed, and this is the state of polymer molecules. Temperature, at which the non-crystalline portion initiates movement, is the glass transition point. Physical properties significantly vary beyond the glass transition point. For example, a sharp decrease in viscosity and the like are observed, and further, great endotherm is observed due to glass transition. Specifically, since in non-crystalline polymer materials, glass transition gradually occurs over a wide temperature range, occasionally, the glass transition point is not clearly identified.

Resins employed in the optical compensating resin film of the present invention are not particularly limited. In view of transmittance required to the optical film, preferred are polycarbonate, polyester, cellulose ester, and polycyloolefin, and more preferred are cellulose ester and polycyloolefin. Of these, most preferably employed is cellulose ester.

(Cellulose Ester)

It is preferable that the cellulose ester preferably employed in the present invention is a lower fatty acid ester of cellulose. "Lower fatty acid" in the lower fatty acid ester of cellulose means a fatty acid having at most 6 carbon atoms. For example, it is possible to employ cellulose acetate, cellulose propionate, and cellulose butyrate, as well as mixed fatty acid esters such as cellulose acetate propionate or cellulose acetate butyrate, described in JP-A Nos. 10-45804 and 8-231761, and U.S. Pat. No. 2,319,052. Of those described above, the lower fatty acid ester which is specifically preferably employed includes cellulose triacetate and cellulose acetate propionate. These cellulose esters may be employed individually or blended.

In the case of cellulose triacetate, one at an average acetylation degree (being an amount of combined acetic acid) of 54.0-62.5% is preferably employed, while one at an average acetylation degree of 58.0-62.5% is more preferable.

Other than cellulose triacetate, preferred cellulose esters are those which have an acyl group having 2-4 carbon atoms as a substituent and satisfy following Formulas (I) and (II).

$$2.1 \leq X+Y \leq 2.6 \quad (I)$$

$$1.0 \leq X \leq 2.6 \quad (II)$$

wherein X is the substitution degree of an acetyl group, and Y is the substitution degree of a fatty acid ester group having 2-4 carbon atoms.

Of these, preferred is cellulose acetate propionate which satisfies following Formulas.

$$1.0 \leq X \leq 2.0 \quad (III)$$

$$0.5 \leq Y \leq 1.3 \quad (IV)$$

A hydroxyl group commonly exists in the portion which is not substituted with the acyl group. It is possible to synthesize these via conventional methods. It is possible to determine the substitution degree of the acyl group in accordance with the specification of ASTM-D817-96.

Cellulose esters, which are synthesized employing, as a raw material, cotton linter, wood pulp, or kenaf, may be employed individually or blended. Specifically, it is preferable that cellulose esters which are synthesized employing cotton linter (hereinafter also referred simply to as linter) are employed individually or blended.

Further, it is typical that as the molecular weight of cellulose esters increases, the variation ratio of elastic modulus, due to heat, decreases. However, when the molecular weight is increased excessively, viscosity of a cellulose ester-dissolved solution increases excessively to lower productivity. The molecular weight of cellulose esters is preferably 30,000-200,000 in terms of number average molecular weight (Mn), but is more preferably 40,000-170,000.

Conditions to determine the number average molecular weight and volume average molecular weight of cellulose esters, employing high speed chromatography, are as follows.

Solvent: methylene chloride
Columns: SHODEX K806, K805, and K803G (produced by Showa Denko K. K.) were employed while connecting those three.
Column temperature: 25° C.
Sample concentration: 0.1% by weight
Detector: RI Model 504 (produced by GL Science Co.)
Pump: L6000 (produced by Hitachi Ltd.)
Flow rate: 1.0 ml/minute
Calibration curve: A calibration curve prepared by employing 13 samples of STANDARD POLYSTYRENE STK, standard polystyrene (produced by Tosoh Corp.) at Mw=500-1,000,000 was employed. It is preferable that 13 samples are provided in approximately equal Mw intervals.

Now, a manufacturing method of the cellulose ester film of the present invention will be described. The cellulose ester film of the present invention is manufactured via a process in which a dope liquid is prepared by dissolving cellulose ester and additives in solvents, a process in which the dope liquid is cast onto a support, and a process in which the cast dope liquid is dried.

It is preferable that the concentration of cellulose ester in the dope liquid is relatively high, since it is possible to decrease the drying load after casting. However, when the concentration of cellulose ester is excessively high, load during filtration increases, resulting in degraded filtration accuracy. The concentration which makes those compatible is preferably 10-50% by weight, but is more preferably 15-35% by weight.

Solvents employed in the dope liquid may be employed individually or in combinations. In view of production efficiency, it is preferable that good and poor cellulose ester solvents are mixed and employed. In view of dissolution of cellulose esters, it is preferable that the amount of good solvents is greater. The preferred mixing ratio of good solvents and poor solvents is in the range of 70-98% by weight of the good solvents and 30-2% by weight of the poor solvents.

"Good solvent", as described herein, is defined as one which dissolves employed cellulose esters by itself, while "a poor solvents" is defined as one which swells or does not dissolve the same by itself. Therefore, a good solvents may become a poor solvent, depending on the average acetylation degree of cellulose esters. For example, when acetone is employed as a solvent, it becomes a good solvent of cellulose acetate (at a combined acetic acid amount of 55%) and cellulose acetate propionate, while it becomes a poor solvent of cellulose acetate (at a combined acetic acid amount of 60%).

Good solvents are not particularly limited, and in the case of cellulose triacetate, examples thereof include organic halide compounds such as methylene chloride, and dioxolanes, while in the case of cellulose acetate propionate, they include methylene chloride, acetone and methyl acetate.

Further, poor solvents are also not particularly limited, and preferably employed examples thereof include methanol, ethanol, n-butanol, cyclohexane, acetone, and cyclohexane.

As a method to dissolve cellulose esters during preparation of the above dope liquid, it is possible to employ any of the common methods. When heating and pressurizing are combined, it is possible to achieve heating at a higher temperature than the boiling point under normal pressure. It is preferable that dissolution is carried out while stirring under application of pressure in any range of temperature at which solvents do not boil, since formation of aggregated insoluble compounds called gel or "mamako" is minimized. Further, a method is preferably employed in which cellulose esters are blended with poor solvents and after wetting or swelling, dissolution is carried out by the addition of good solvents.

Pressurization may be carried out by employing a method in which an inert gas such as nitrogen is introduced under pressure, or a method in which the vapor pressure of solvents is increased by heating. It is preferable that heating is performed from the exterior. For example, a jacket type heater is preferred due to the ease of precise temperature control.

When solvents are added, in view of dissolution of cellulose esters, it is preferable that the heating temperature is high. However, when the heating temperature is excessively high, required pressure becomes higher, whereby productivity is degraded. The heating temperature is preferably in the range of 45-120° C., is more preferably in the range of 60-110° C., but is most preferably in the range of 70-105° C. Further, pressure is regulated so that solvents do not boil at any predetermined temperature.

Subsequently, the resulting cellulose ester solution is filtered by employing an appropriate filtering material such as filter paper. To remove insoluble materials, it is preferable that absolute filtering accuracy is low. However, when the absolute filtering accuracy is excessively low, problems occur in that filtering materials tend to become clogged. Due to that, the absolute filtering accuracy of filtering materials is preferably at most 0.008 mm, is more preferably in the range of 0.001-0.008 mm, but is most preferably in the range of 0.003-0.006 mm.

Quality of filtering materials is not particularly limited, and most common filtering materials are employable. Of these, preferred are those composed of plastics such as polypropylene or TEFLON (registered trade name), or metal such as stainless steel since these result in no dropouts such as fibers.

It is possible to filter a dope liquid via common methods. A method is preferable in which filtration is carried out at a temperature which is higher than the boiling point of solvents at normal pressure and in the temperature range in which the solvents do not boil under application of pressure, since any increase in pressure difference before and after the filtering materials (hereinafter also referred to as filtration pressure) is small. The temperature is preferably in the range of 45-120° C., is more preferably 45-70° C., but is most preferably 45-55° C. The lower filtration pressure is preferred. The filtration pressure is preferably at most 1.6 MPa, is more preferably at most 1.2 MPa, but is most preferably at most 1.0 MPa.

Preferably employed as a support in a casting process is a looped stainless steel belt or a drum. Temperature of the support in the casting process is 0° C.—less than boiling point of the solvent. A higher temperature is preferred since it is possible to increase the drying rate. However, when it is excessively high, occasionally, foaming and degradation of flatness tend to result. The support temperature is preferably 0-40° C. It is more preferable to achieve casting onto a support in the temperature range of 5-30° C. Methods to control the temperature of the support are not particularly limited, and include a method in which heated or cooled airflow is impinged, or a method in which a heated water vat is brought into contact with the support. It is more preferable to employ the heated water vat since duration to increase the temperature of a support to the predetermined value is shortened due to more efficient heat transmission. When the heated airflow is employed, occasionally, it is necessary to employ airflow at a higher temperature than the targeted temperature.

The present invention has enabled controlling of the orientation of the resin in film and maintaining low crystallinity degree of the film by employing a method in which a cellulose ester solution is cast onto the above support, and after peeling, the resulting film is conveyed in an ambience of at most 55° C. for at least 90 seconds, followed by stretching.

It is possible to appropriately regulate the temperature and duration during the above conveyance so that the crystallinity degree of the optical compensating resin films is within at least 0.15. Conveying temperature immediately after peeling is preferably at most 55° C., but is most preferably in the range of 0-50° C. The conveying duration prior to orientation is preferably at least 90 seconds at the above conveying temperature, but is more preferably in the range e of 90-300 seconds.

Further, in the drying process of an optical compensating resin film, it is preferable that the film peeled from the support is further dried so that the residual solvent amount reaches at most 3%. The more preferred residual solvent amount is at most 0.5%. In a film drying process, commonly employed is a roll suspension system or a drying system in which film is dried while conveyed via a tenter system.

To realize targeted effects of the present invention and enhancement of film flatness, it is preferable that during the presence of a large amount of residual solvents after peeling from the support, width retention or stretching is carried out via the tenter system.

Means to dry film are not particularly limited, and it is common to achieve drying via heated airflow, infrared rays, heating rollers, and microwaves, while in view of convenience, it is preferable that drying is carried out via heated airflow.

It is preferable that drying temperature is gradually increased within the range of 40-170° C. In order to improve dimensional stability, it is more preferable that the drying is carried out within the range of 50-170° C. Conveying tension is preferably in the range of 80-350 N/m, but is more preferably in the range of 80-200 N/m.

Film thickness is not particularly limited, and it is possible to prepare any of the appropriate thick films. The film thickness after finishing, treatments such as drying or stretching is preferably 10-500 μm, is more preferably 20-120 μm, is still more preferably 30-80 μm, but is most preferably 30-60 μm.

The optical compensating resin film of the present invention at a width of 1-4 m is preferably employed.

Based on the constitution of the present invention, an optical compensating resin film, which also excels in flatness, is prepared, whereby marked effects are realized in a cellulose ester film of a greater width. Specifically, a width of 1.4-4 m is preferably employed, and a width of 1.4-2 m is most preferably employed.

If desired, added to the cellulose ester film of the present invention may be additives such as UV absorbers, dyes or matting agents. In view of minimizing degradation of liquid crystals, preferably employed UV absorbers may be those which excel in absorption of UV-rays of a wavelength of at most 370 nm, while in view of optimal liquid crystal display capability, preferably employed UV absorbers may be those which result in minimal absorption of visible light of a wavelength of at least 400 nm. Specifically, in the present invention, transmittance at 370 nm wavelength is preferably at most 10%, is more preferably at most 5%, but is most preferably at most 2%.

In the present invention, most preferably employed are UV absorbers having at least two aromatic rings in their molecule. Employed UV absorbers are not particularly limited, and examples thereof include oxybenzophenone based compounds, benzotriazole based compounds, salicylic acid ester based compounds, benzophenone based compounds, cyanoacrylate based compounds, nickel complex salt based compounds, and inorganic powders. Preferably employed UV absorbers include benzotriazole based UV absorbers and benzophenone based UV absorbers, both which exhibit high transparency and exhibit excellent effects to minimize degradation of polarizing plates and liquid crystal elements. Of these, specifically preferred are benzotriazole based UV absorbers which result in minimal unnecessary coloration. Specific examples of UV absorbers include TINUVIN 109, TINUVIN 171, TINUVIN 326, TINUVIN 327 and TINUVIN 328, however examples are not limited thereto.

UV absorbing agents may be employed individually or in combinations of at least two types. Further, as a UV absorbing agent, employed may be polymer UV absorbing agents. Specifically, preferably employed are polymer type absorbing agents, described in JP-A No. 6-148430.

UV absorbing agents may be incorporated via a method in which UV absorbing agents are dissolved in organic solvents such as alcohol, methylene chloride, or dioxolanes, followed by the addition to a dope, or in which they are directly added to a dope composition. The employed amount of UV absorbing agents varies depending on the type of compounds and employed conditions. When the dried thickness of the optical compensating resin film is 30-200 μm, the above amount is preferably 0.5-4.0% by weight with respect to the optical compensating resin film, but is more preferably 0.6-2.0 g. In the present invention, in order to retard film yellowing, blue dyes may be incorporated. Preferred dyes include anthraquinone based dyes. In order to maintain transparency of the film, the added amount of these dyes is commonly 0.1-1,000 μg/m$^2$, but is preferably 10-100 μg/m$^2$.

In the present invention, if necessitated, incorporated may be minute particles such as silicon oxide as a matting agent. It is preferable that minute matting agent particles are subjected to a surface treatment, via organic compounds, to decrease haze of the film. Preferred organic compounds for the surface, treatment include halosilanes, alkoxysilanes, silazane, and siloxane. As the average diameter of minute particles increases, the resulting matting effect increases, while as the average diameter decreases, transparency is enhanced. Accordingly, the average diameter of the primary minute particles is preferably 5-50 nm, but is more preferably 7-20 nm.

Minute silicon oxide particles are not particularly limited, and examples thereof include AEROSIL 200, 200V, 300, R972, R972V, R972CF, R974, R202, R805, R812, OX50, and TT600, all produced by Nippon Aerosil Co., Ltd. Preferably listed are AEROSIL 200, 200V, R972, R972V, R974, R202, R805, and R812.

Various additives may be subjected to batch addition to a dope liquid. Alternately, additive dissolved solutions may be separately prepared and may be subjected to in-line addition. When the additive dissolved solution is subjected to in-line addition, in order to enhance blending with the dope, it is preferable to dissolve a small amount of cellulose ester. The cellulose ester amount is preferably 1-10 parts by weight with respect to 100 parts by weight of the solvents, but is more preferably 3-5 parts by weight.

In the present invention, in order to achieve in-line addition and blending, preferably employed are those such as a static mixer (produced by Toray Engineering Co., Ltd.) an in-line mixer such as SWJ (Toray static in-line mixer, HI-MIXER).

The optical compensating resin film of the present invention may incorporate plasticizers. In such a case, one of the above plasticizers is preferably the aromatic terminal ester based plasticizer, represented by following Formula (1).

$$B\text{-}(G\text{-}A)n\text{-}G\text{-}B \qquad \text{Formula (1)}$$

wherein B represents a benzene monocarboxylic acid residual group; G represents an alkylene glycol residual group having 2-12 carbon atoms; an aryl glycol residual group having 6-12 carbon atoms, or an oxyalkylene glycol residual group having 4-12 carbon atoms; A represents an alkylene dicarboxylic acid residual group having 4-12 carbon atoms or an aryl dicarboxylic acid residual group having 6-12 carbon atoms; and n represents an integer of 1 or more.

In Formula (1), constitution is made via the benzene monocarboxylic acid residual group represented by B, the alkylene glycol residual group, oxyalkylene glycol residual group, or aryl glycol residual group represented by G, and the alkylenedicarboxylic acid residual group or aryl dicarboxylic acid residual group represented by A. Preparation is achieved via the same reaction as for common polyester based plasticizers.

Examples of benzene monocarboxylic acid components of the ester based plasticizers, employed in the present invention, include benzoic acid, para-tertiarybutylbenzoic acid, orthotoluic acid, metatoluic acid, paratoluic acid, dimethyl benzoate, normal propyl benzoate, aminobenzoic acid, and acetoxybenzoic acid. These may be employed individually or in combinations of at least two types.

Alkylene glycol components having 2-12 carbon atoms of the ester based plasticizers of the present invention include ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol 1,6-hexanediol, 2,2,4-trimethyl 1,3-pentanediol, 2-ethyl-1,3-hexanediol, 2-methyl-1,8-octanediol, 1,9-nonanediol, 1,10-decanediol, and 1,12-octadecadiol. These glycols are employed individually or in mixtures of at least two types.

Examples of oxyalkylene glycol components having 4-12 carbon atoms of the aromatic terminal esters of the present invention include diethylene glycol, triethylene glycol, tetraethylene glycol, dipropylene glycol, and tripropylene glycol. These glycols are employed individually or in mixtures of at least two types.

Further, examples of aryl glycol components having 6-12 carbon atoms of the aromatic terminal esters of the present invention include hydroquinone, resorcin, bisphenol A, bisphenol F, and bisphenol. These glycols may be employed individually or in mixtures of at least two types.

Examples of alkylene dicarboxylic acid components having 4-12 carbon atoms of the aromatic terminal esters of the present invention include succinic acid, maleic acid, fumaric acid, glutaric acid, adipic acid, azelaic acid, sebacic acid, and dodecanedicarboxylic acid. These are employed individually or in mixtures of at least two types. Arylenedicarboxylic acid components having 6-12 carbon atoms include phthalic acid, terephthalic acid, 1,5 naphthalenedicarboxylic acid, and 1,4 naphthalenedicarboxylic acid.

The number average molecular weight of the ester based plasticizers employed in the present invention is preferably in the range of 300-2,000, but is more preferably in the range of 500-1,500. The acid value thereof is commonly at most 0.5 mg KOH/g, but is preferably at most 0.3 mg KOH/g, while the hydroxyl group value thereof is commonly at most 25 mg KOH/g, but is preferably at most 15 mg KOH/g.

(Acid Value and Hydroxyl Group Value of Aromatic Terminal Ester)

"Acid value", as described herein, refers to the amount of potassium hydroxide in mg, which is necessary to neutralize the acid (namely a carboxyl group existing in the terminal molecule) incorporated in 1 g of a sample. The present acid value is determined based on JIS K0070 (1992).

The hydroxyl group value is determined based on JIS K0070 (1992). The above hydroxyl group value is defined as the amount of potassium hydroxide in mg which is necessary to neutralize the acetic acid bonded to the hydroxyl group when 1 g of a sample is acetylated. In practice, X g (approximately 1 g) of a sample is accurately weighed and placed in a flask, followed by the addition of 20 ml of an acetylating reagent (which is prepared by adding pyridine to 20 ml of acetic anhydride to make 400 ml). An air cooling pipe is fitted at the mouth of the flask and the resulting mixture is heated via a glycerin bath heated within the range of 95-100° C. After one and a half hours, cooling is carried out and 1 ml of purified water is added through the air cooling pipe, whereby acetic anhydrides are decomposed to acetic acid. Subsequently, by employing a potentiometric titrator, titration is carried out via a 0.5 mol/L potassium hydroxide ethanol solution, and the inflection point of the resulting titration curve is designated as the end point. Further, as a blank test, titration is carried out in the absence of the sample, and the inflection point of the titration curve is also obtained. A hydroxyl group value is then calculated via the following formula:

Hydroxyl group value=$\{(B-C) \times f \times 28.05/X\}+D$ wherein B represents the amount (ml) of the 0.5 mol/L potassium hydroxide ethanol solution employed for the blank test, C represents the amount (ml) of the 0.5 mol/L potassium hydroxide ethanol solution employed for titration, f represents the factor of the 0.5 mol/L potassium hydroxide ethanol solution, D represent acid value, and 28.05 represents ½ of 56.11 of 1 mol of potassium hydroxide.

A synthesis example of the aromatic terminal ester based plasticizers employed in the present invention will now be described.

<Sample No. 1 (Aromatic Terminal Ester Sample)>

All of 410 parts of phthalic acid, 610 parts of benzoic acid, 737 parts of dipropylene glycol, and 0.40 part of tetraisopropyl titanate, serving as a catalyst, were placed in a reaction vessel. Under a flow of nitrogen, a reflux condenser was attached, and while stirring, excessive monohydric alcohol was refluxed and heating was continued at 130-250° C. until the acid value reached at most 2, whereby generated water was continuously removed. Subsequently, the resulting distillate was removed at 200-230° C. under a reduced pressure of $1.33 \times 10^4$ Pa—finally $4 \times 10^2$ Pa. Thereafter, filtration was carried out, whereby an aromatic terminal ester based plasticizer having the following parameters was prepared:

Viscosity (mPa·s at 25° C.); 43,400
Acid value; 0.2

<Sample No. 2 (Aromatic Terminal Ester Sample)>

An aromatic terminal ester having the following parameters was prepared in the same manner as Sample No. 1, except that employed in the reaction vessel were 410 parts of phthalic acid, 610 parts of benzoic acid, 341 parts of ethylene glycol, and 0.35 part of tetraisopropyl titanate, serving as a catalyst.

Viscosity (mPa·s at 25° C.); 31,000
Acid value; 0.1

<Sample No. 3 (Aromatic Terminal Ester Sample)>

An aromatic terminal ester having the following parameters was prepared in the same manner as Sample No. 1, except that in the reaction vessel employed were 410 parts of phthalic acid, 610 parts of benzoic acid, 418 parts of 1,2-propanediol, and 0.35 part of tetraisopropyl titanate, serving as a catalyst.

Viscosity (mPa·s at 25° C.); 38,000
Acid value; 0.05

<Sample No. 4 (Aromatic Terminal Ester Sample)>

An aromatic terminal ester having the following parameters was prepared in the same manner as Sample No. 1, except that in the reaction vessel employed were 410 parts of phthalic acid, 610 parts of benzoic acid, 418 parts of 1,3-propanediol, and 0.35 part of tetraisopropyl titanate, serving as a catalyst.

Viscosity (mPa·s at 25° C.); 37,000
Acid value; 0.05

Specific compounds of the aromatic terminal ester plasticizers will now be cited, however the present invention is not limited thereto.

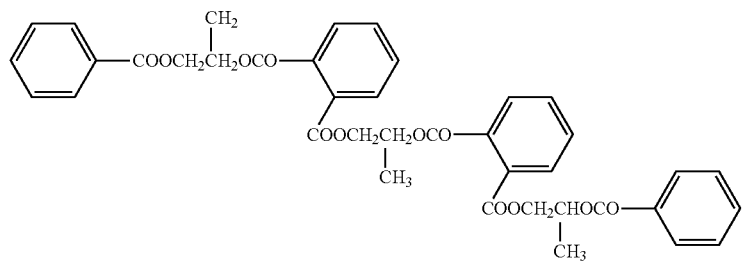
(1)
Mw: 696
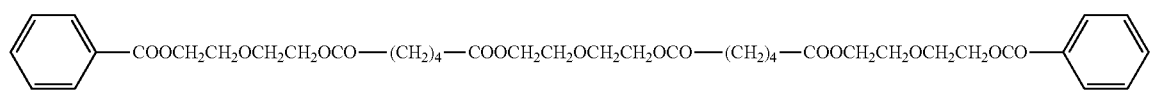
(2)
Mw: 746
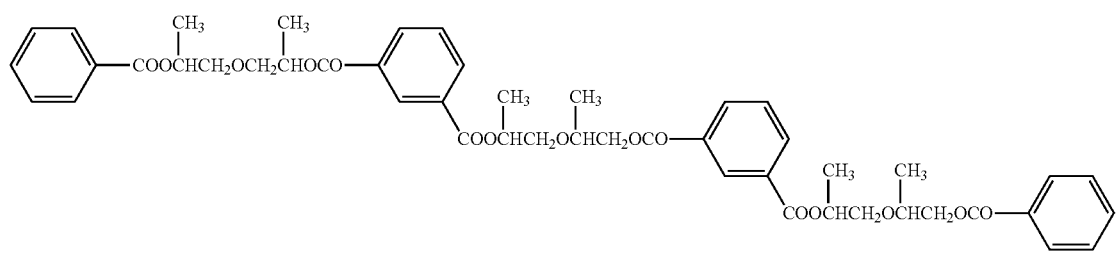
(3)
Mw: 830
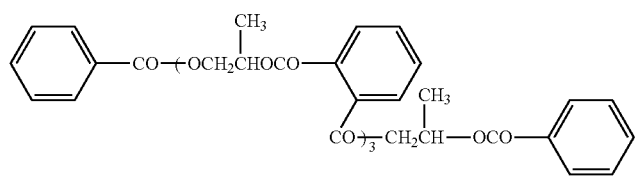
(4)
Mw: 886
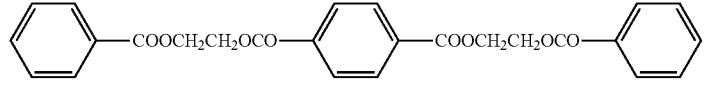
(5)
Mw: 462
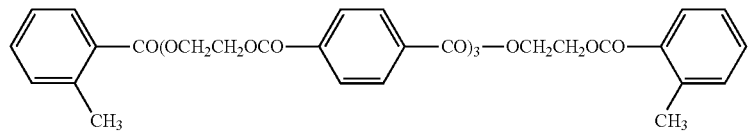
(6)
Mw: 874
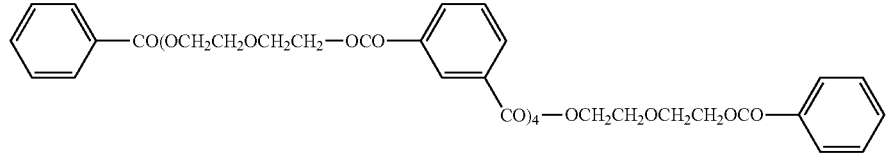
(7)
Mw: 1258
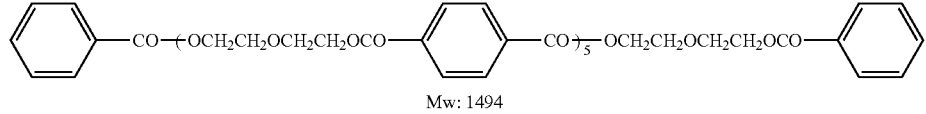
(8)
Mw: 1494

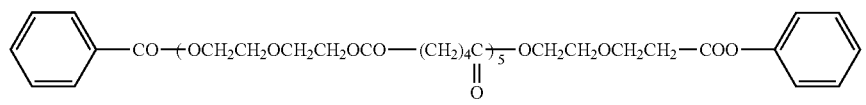
(9)

Mw: 1394

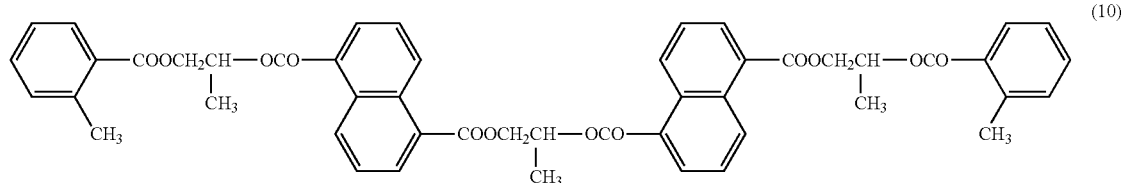
(10)

Mw: 852

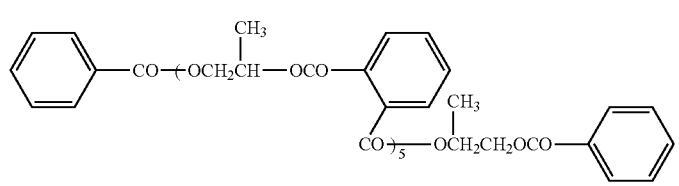
(11)

Mw: 1314

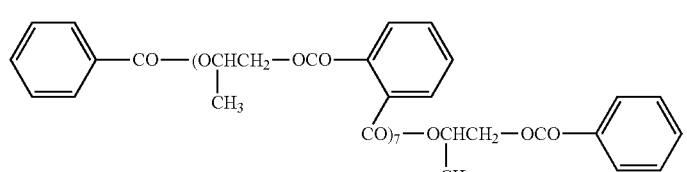
(12)

Mw: 1726

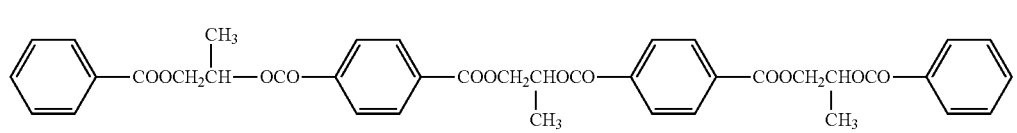
(13)

Mw: 696

The content of the aromatic terminal ester based, plasticizers employed in the present invention is 1-20% by weight with respect to the optical compensating resin film, but is more preferably 3-11% by weight. In the present invention, it is preferable to further incorporate polyhydric alcohol ester based plasticizers.

The polyhydric alcohol ester employed in the present invention is composed of ester of bi- or higher hydric alcohol and monocarboxylic acid. It is preferable that aromatic rings or cycloalkyl rings are also incorporated in the molecule.

It is also preferable that the optical compensating resin film according to the present invention incorporates Plasticizers other than those described above.

It is possible to decrease elution of plasticizers via incorporation of at least two types of them. Though the reason is not fully understood, it is assumed that it is possible to decrease the added amount per one type, and elution is retarded via mutual interaction among at least two types of plasticizers and with cellulose ester.

Plasticizers employable in the present invention include the following.

As other preferable plasticizers, it is possible to employ phosphoric acid ester based plasticizers, phthalic acid ester based plasticizers, trimellitic acid ester based plasticizers, pyromellitic acid based plasticizers, polyhydric alcohol based plasticizers, glycolate based plasticizers, citric acid ester based plasticizers, fatty acid ester based plasticizers, and carboxylic acid ester based plasticizers.

It is preferable that the polyhydric alcohol ester is composed of ester of bi- or higher hydric aliphatic alcohol and monocarboxylic acid, and aromatic rings or cycloalkyl rings are incorporated in the molecule.

Polyhydric alcohol employed in the present invention is represented by following Formula (2).

$$R1\text{-}(OH)n \quad \quad \text{Formula (2)}$$

wherein R1 represents an "n" valent organic group, and "n" represents a positive integer of at least 2.

As examples of preferred polyhydric alcohol, listed may be the following, however the present invention is not limited thereto: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanedil, 1,6-hexanediol, hexanetriol, galactitol, mannitol, 3-methylpentane-1,3,5-triol, pinacol, sorbitol, trimethyloipropane, trimethylolethane, and xylitol. Specifically preferred are triethylene glycol, tetraethylene glycol, dipropylene glycol, tripropylene glycol, sorbitol, trimethyloipropane, and xylitol.

Monocarboxylic acids employed in polyhydric alcohol ester of the present invention are not particularly limited, and employed may be aliphatic monocarboxylic acid, alicyclic monocarboxylic acid, and aromatic monocarboxylic acid, which are known in the art. In view of enhancement of moisture permeability and reservation, it is preferable to employ alicyclic monocarboxylic acids and aromatic monocarboxylic acids.

It is possible to list the following as examples of preferred monocarboxylic acids, however the present invention is not limited thereto.

As aliphatic monocarboxylic acids, preferably employed may be any of the fatty acids having a straight or branched chain having 1-32 carbon atoms. The more preferred number of carbon atoms is 1-20, but the most preferred number is 1-10. It is preferable to incorporate acetic acid since compatibility with cellulose derivatives is thereby improved. It is also preferable to employ a mixture of acetic acid and other monocarboxylic acids.

Preferred aliphatic monocarboxylic acids include saturated fatty acids such as acetic acid, propionic acid, butyric acid, valeric acid, caproic acid, enanthic acid, caprylic acid, pelargonic acid, castearic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanic acid, arachidic acid, behenic acid, lignoceric acid, cerotic acid, heptacosanic acid, montanic acid, melissic acid, or lacceric acid, as well as unsaturated fatty acids such as undecylenic acid, oleinic acid, sorbinic acid, linoleic acid, linolenic acid, or arachidonic acid.

As examples of preferred alicyclic carboxylic acids, listed may be cyclopentanecarboxylic acid, cyclohexanecarboxylic acid, cyclooctanecarboxylic acid, and derivatives thereof.

As examples of preferred aromatic monocarboxylic acids, listed may be those in which an alkyl group is introduced into the benzene ring of benzoic acid such as benzoic acid or toluic acid, aromatic monocarboxylic acids, such as biphenylcarboxylic acid, naphthalenecarboxylic acid, or tetralinecarboxylic acid, having at least two benzene rings, and derivatives thereof. Of these, benzoic acid is specifically preferred.

The molecular weight of polyhydric alcohol ester is not particularly limited. It is preferably 300-1,500, but is more preferably 350-750. As the molecular weigh increases, the resulting volatilization becomes less. Consequently, in view of moisture permeability and compatibility with cellulose derivatives, it is preferable that the molecular weight is low.

Carboxylic acids employed in the polyhydric alcohol ester may be of one type or of a mixture of at least two types. All OH groups in the polyhydric alcohol may be esterified or some of them remain as an OH group.

Specific compounds of polyhydric alcohol esters are listed below.

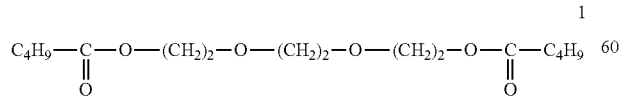

1

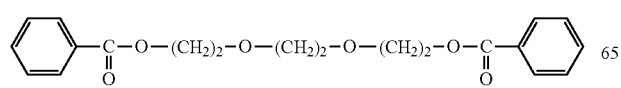

2

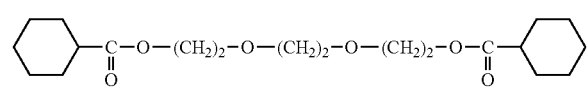

3

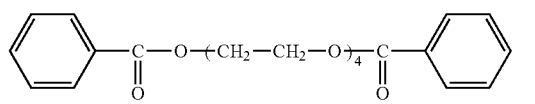

4

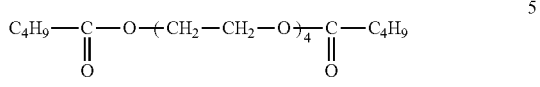

5

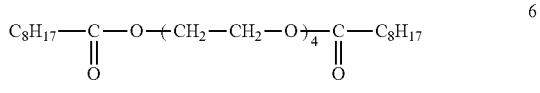

6

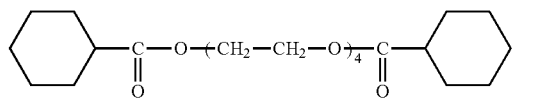

7

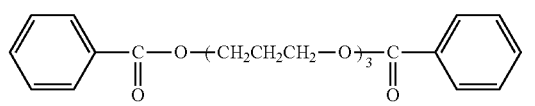

8

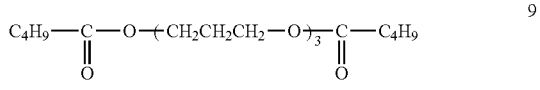

9

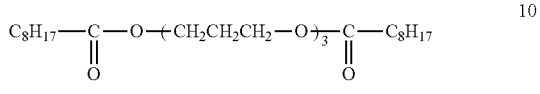

10

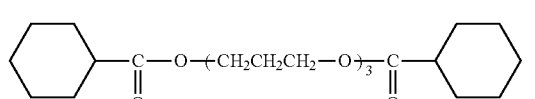

11

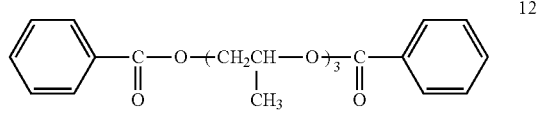

12

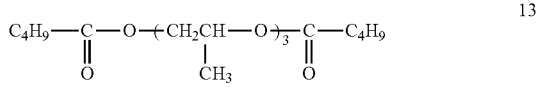

13

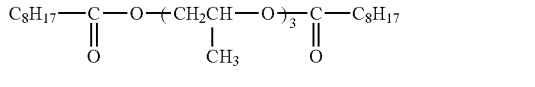

14

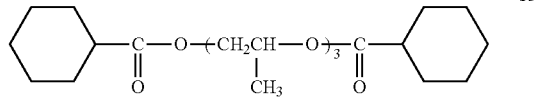

15

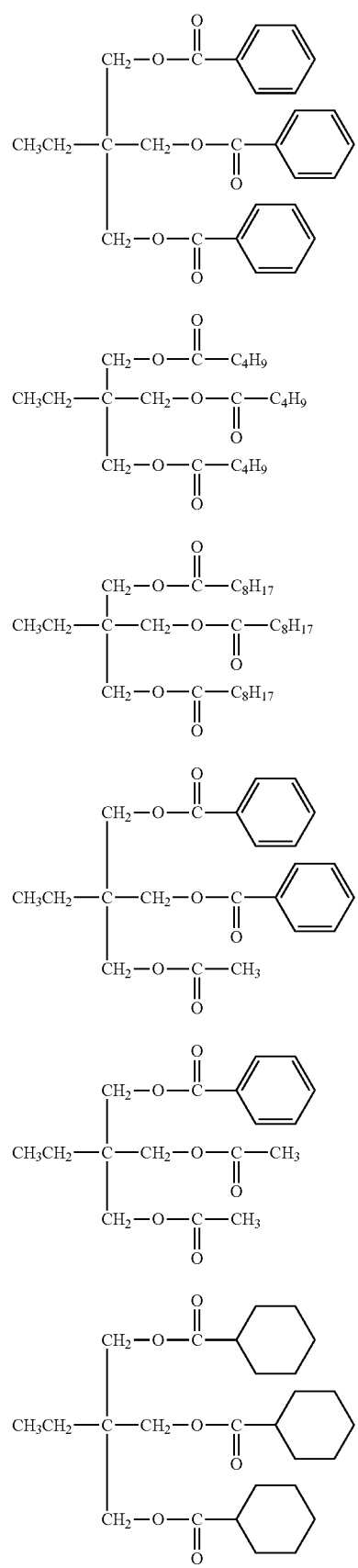
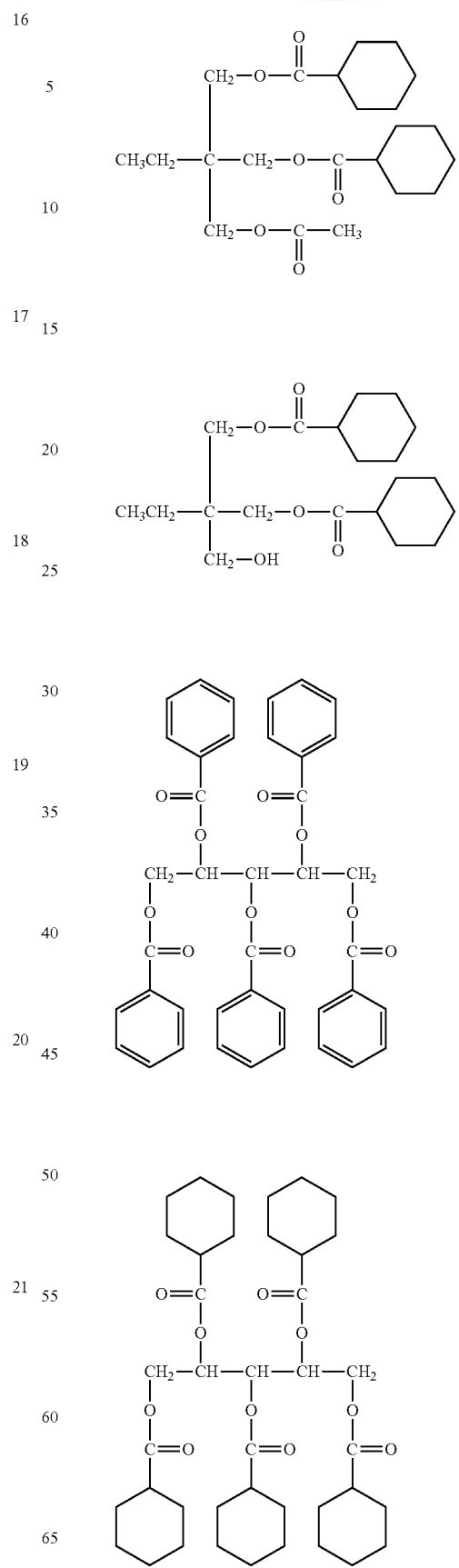

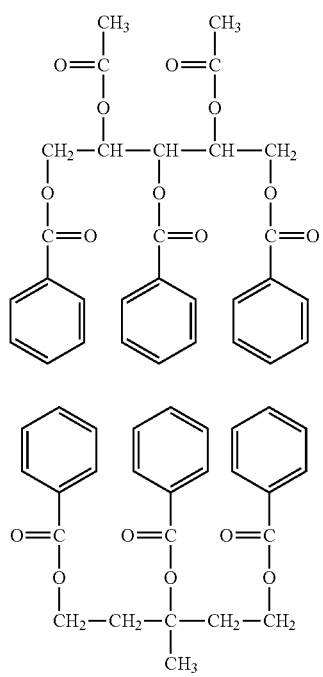

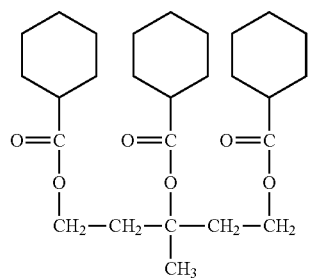

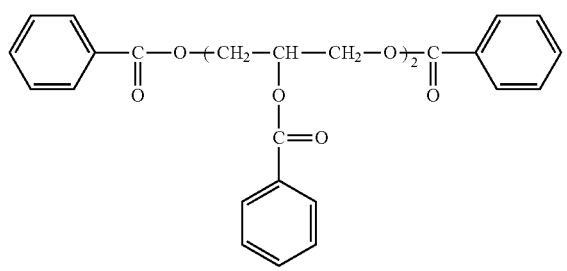

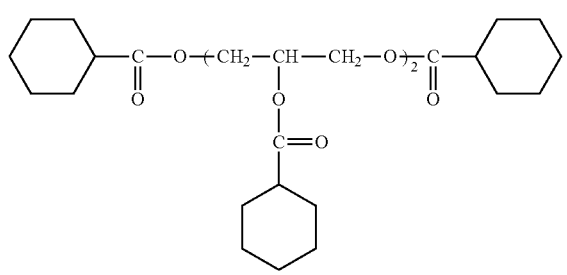

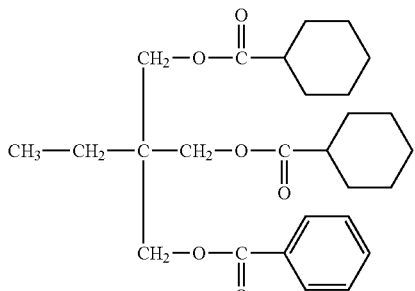

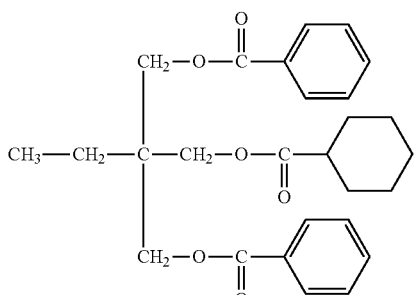

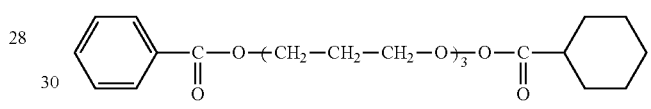

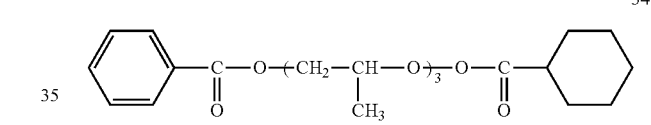

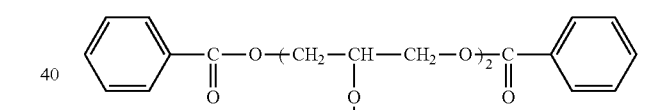

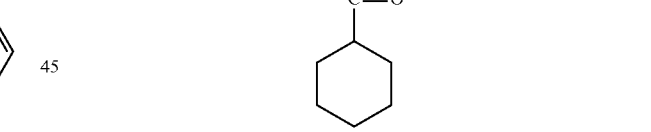

In the present invention, preferably employed are polyvalent carboxylic acid based plasticizers, and it is possible to employ plasticizers composed of at least divalent, but preferably di- to icosa-valent polyhydric carboxylic acids and alcohol esters. Further aliphatic polyhydric carboxylic acids are preferably to be di- to icosa-valent.

Polyvalent carboxylic acids employed in the present invention are represented by following Formula (3).

$$R5(COOH)m(OH)n \qquad \text{Formula (3)}$$

wherein R5 represents a (m+n) valent organic group, m represent an integer of 2 or more, n represents an integer of at 0 or more, the COOH group represents a carboxyl group, and the OH group represents an alcoholic or phenolic hydroxyl group. Examples of preferably employable polyvalent carboxylic acids include, but are not limited to, tri- or higher valent aromatic polyvalent carboxylic acids such as trimellitic acid, or pyromellitic acid, and derivatives thereof; aliphatic polyvalent carboxylic acids such as succinic acid, adipic acid, azelaic acid, sebacic acid, oxalic acid, fumaric acid, maleic acid, or tetrahydrophthalic acid, and oxy-polyvalent carboxylic acids such as tartaric acid, tartronic acid, malic acid, or citric acid. Of these, in view of enhancing holding capability, it is preferable to employ the oxy polyvalent carboxylic acids.

Alcohols which are employed in polyvalent carboxylic acid esters employable in the present invention are not particularly limited, and it is possible to employ phenols and alcohols known in the art. For example, it is possible to preferably employ aliphatic saturated or unsaturated alcohols with straight or branched chains, each having 1-32 carbon atoms. The number of carbon atoms is more preferably 1-20, but is most preferably 1-10. Further, it is possible to preferably employ alicyclic alcohols such as cyclopentane or cyclohexanol, or derivatives thereof, and aromatic alcohols such as benzyl alcohol or cinnamyl alcohol, or derivatives thereof.

When oxy-polyvalent carboxylic acids are employed as a polyvalent carboxylic acid, the alcoholic or phenolic hydroxyl group of the oxy-polyvalent carboxylic acid may be esterified via a monocarboxylic acid. Examples of preferred monocarboxylic acids include the following, however, the present invention is not limited thereto.

As aliphatic monocarboxylic acid, preferably employed may be fatty acids with straight or branched chains, each having 1-32 carbon atoms. The number of carbon atoms is more preferably 1-20, but is most preferably 1-10.

As preferred aliphatic monocarboxylic acids, listed may be saturated fatty acids such as acetic acid, propionic acid, butyric acid, valeric acid, caproic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanic acid, arachidic acid, behenic acid, lignoceric acid, cerotic acid, heptacosanic acid, montanic acid, melissic acid, or lacceric acid, as well as unsaturated fatty acids such as undecylenic acid, oleinic acid, sorbinic acid, linoleic acid, linolenic acid, or arachidonic acid.

As examples of preferred alicyclic monocarboxylic acids, listed may be cyclopentanecarboxylic acid, cyclohexanecarboxylic acid, and cyclooctanecarboxylic acid, as well as derivatives thereof.

As examples of preferred aromatic monocarboxylic acid, listed may be those in which an alkyl group is introduced into the benzene ring of benzoic acid such as benzoic acid or toluic acid, aromatic monocarboxylic acids, such as biphenylcarboxylic acid, naphthalenecarboxylic acid, or tetralinecarboxylic acid, having at least two benzene rings and derivatives thereof. Specifically preferred are acetic acid, propionic acid, and benzoic acid.

The molecular weight of polyvalent carboxylic acid ester compounds is not particularly limited. It is preferably in the range of 300-1,000, but is more preferably in the range of 350-750. In view of enhancement in retention properties, it is preferable that the molecular weight is raised, while in view of moisture permeability and compatibility with cellulose ester, it is preferable that it is lowered.

Alcohols in polyvalent carboxylic acid ester employed in the present invention may be employed individually or in combinations of at least two types.

Acid value of the polyvalent carboxylic acid ester compounds employed in the present invention is preferably at most 1 mg KOH/g, but is more preferably at most 0.2 mg KOH/g. It is preferable that the acid value is regulated within the above range, since ambient variation of retardation is retarded.

Examples of specifically preferred polyvalent carboxylic acid compounds are listed below, however the present invention is not limited thereto. For example, listed are triethyl citrate, tributyl citrate, acetyltriethyl citrate (ATEC), acetyltributyl citrate (ATBC), benzoyltributyl citrate, acetyltriphenyl citrate, acetyltribenzyl citrate, dibutyl tartrate, diacetyldibutyl tartrate, butyl trimellitate, and tetrabutyl pyromellitate.

These plasticizers may be employed individually or a blend of at least two types. The added amount of plasticizers is preferably 4-20% by weight with respect to cellulose ester, is more preferably 6-16% by weight, but is most preferably 7-11% by weight. When the added amount of plasticizers is excessively large, the resulting film becomes excessively soft resulting in an increase of the lowered rate of elastic modulus due to heat, while when it is excessively small, moisture permeability of the resulting film decreases.

(Optical Compensating Resin Film)

A liquid crystal display device employs anisotropic liquid crystal materials and a polarizing plate. Consequently, when viewed from the front, acceptable display results. However when obliquely viewed, display performance is deteriorated, namely problems of a view angle occur, whereby in order to enhance performance, a view angle compensating plate is needed. An average refractive index distribution is higher in the cell thickness direction, while it is lower in the in-plane direction. Therefore, it is known that as the compensating plate, one is effective which enables cancellation of the above anisotropy, or namely has a negative uniaxial structure in which the refractive index in the film thickness direction is less than that in the in-plane direction.

In the present invention, it is preferable that production is such that a resin film at a glass transition temperature of 170-185° C. is stretched. Further, it is preferable that retardation values RD and Rt, defined by the following formulas, simultaneously are 20-300 nm and 70-400 nm at 23° C. and 55% relative humidity, respectively.

$$Ro=(nx-ny) \times d$$

$$Rt=((nx-ny)/2-nz) \times d$$

wherein nx, ny, and nz each represents the refractive index in the major axis x, y, or z direction of a refractive index ellipsoid, nx and ny each represents the refractive index in the in-plane direction of the aforesaid resin film, nz represents the refractive index in the thickness direction, while $nx \geq ny$, and d represents the film thickness (nm).

It is possible to determine retardation values Ro and Rt via an automatic birefringence meter. For example, determination may be made at a wavelength of 590 nm at 23° C. and 55% relative humidity by employing KOBRA-21ADH (produced by Oji Scientific Instruments).

One example of a stretching process (hereinafter also referred to as a tentering process) is described with reference to FIG. 2.

Figure 2:
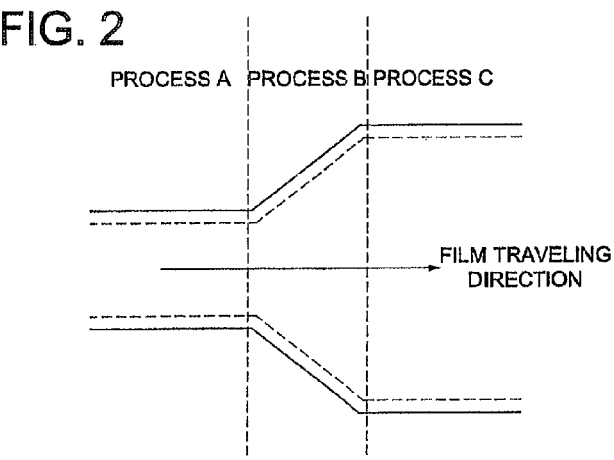
FIG. 2 is a schematic view showing one example of the tentering process employed in the present invention.

In FIG. 2, Process A is one which holds the film which is conveyed from Conveying Process Do, not shown. In following Process B, the film is stretched in the transverse direction (in the direction perpendicular to the film traveling direction), and in Process C, stretching is terminated followed by conveyance while the film is being held.

Prior to Process B from film peeling and/or immediately after Process C, it is preferable to arrange a slitter which slits off the edges in the film transverse direction. Specifically, it is preferable to arrange the slitter to slit off the edges of film immediately prior to Process A. In the case in which the same stretching is carried out in the transverse direction, when the case in which film edges are cut off prior to Process B is compared to the case in which film edges are not cut off, the former results in more improved orientation angle distribution than the latter.

This is assumed to be due to effects which retard stretching in the longitudinal direction, which is not intended, from peeling at which the residual solvent amount is relatively large to Transverse Stretching Process B.

In the tentering process, it is preferable to intentionally provide zones which defer in temperature to improve the orientation angle distribution. Further, it is also preferable to provide a neutral zone between the above zones which differ in temperature so that zones do not interfere with each other.

Further, a stretching operation may be carried out while divided to several stages. It is preferable to carry out biaxial stretching in the casting direction and the transverse direction. Still further, when biaxial stretching is carried out, simultaneous biaxial stretching or stepped stretching may be employed. In this case, "stepped" includes the following stretching. For example, stretching, which differs in the stretching direction, may sequentially be carried out. Alternately, stretching in the same direction is divided to several stages, and stretching which differs in direction may be included in any of the stages. Namely, it is possible to employ the following stretching steps:

stretching in the casting direction-stretching in the transverse direction-stretching in the casting direction-stretching in the casting direction stretching in the transverse direction-stretching in the transverse direction-stretching in the casting direction-stretching in the casting direction Further, simultaneous biaxial stretching includes the case in which stretching is carried out in one direction and contraction is carried out by relaxing tension in another direction. Preferred stretching range during simultaneous biaxial stretching is x1.05-x1.5 in the transverse direction and x0.8-x1.3 in the longitudinal direction (the casting direction). It is more preferable that the stretching factor is regulated to x1.1-x1.5 in the transverse direction and to x0.8-x0.99 in the longitudinal direction, and is most preferably that the stretching factor is regulated to x1.1-x1.4 in the transverse direction and to x0.9-x0.99 in the longitudinal direction.

Further, "stretching direction", as described in the present invention, is commonly employed to mean the direction to which stretching stress is applied when a stretching operation is carried out. When biaxial stretching is carried out in steps, occasionally, it is employed to mean the direction in which finally, the stretching factor becomes larger (namely, the direction which commonly becomes the delayed phase axis). Specifically, in the case in which description is made with regard to the dimensional variation rate, the simple statement "stretching direction" is mainly employed to refer to the latter. The residual solvent amount is represented by the aforesaid formula.

When film is stretched in the transverse direction, it is known that in the transverse direction of the film, the distribution of the optical delayed phase axis (hereinafter referred to as orientation angle distribution) deteriorates. In order to carry out transverse stretching while retaining values Rt and Ro to result in a constant ratio, and under the preferable state of the orientation angle distribution, in Processes A, B, and C, a relative relationship among film temperatures exist. When each of the film temperatures at the end point of Processes A, B, and C is represented by $Ta°$ C., $Tb°$ C., and $Tc°$ C. it is preferable that $Ta \leq Tb-10$ or $Tc \leq Tb$, but it is more preferable that $Ta < Tb-10$ and $Tc \leq Tb$.

In order to improve the orientation angle distribution, the film temperature increasing rate in Process B is preferably in the range 0.5-10° C./second.

In order to decrease crystallinity degree, the stretching duration in Process B is preferably short. On the other hand, in view of film uniformity, it is regulated to be within the range of the shortest necessary stretching duration. Specifically, it is preferably in the range of 1-10 seconds, but is more preferably in the range of 4-10 seconds. Further, temperature of Process B is commonly 40-180° C., but is preferably 120-160° C.

Further, in order to decrease crystallinity degree, during stretching, it is preferable to provide a process which carries out stretching at a temperature of at most Tg of resin–10° C. or at Tg+10° C.

In the above tentering process, the coefficient of heat transfer may be kept constant, or may be varied. The coefficient of heat transfer to be maintained is preferably in the range of $41.9\text{-}419 \times 10^3$ J/m$^2$ hr, is more preferably in the range of $41.9\text{-}209.5 \times 10^3$ J/m$^2$ hr, but is more preferably in the range of $41.9\text{-}126 \times 10^3$ J/m$^2$ hr.

In order to decrease crystallinity degree, the stretching rate in the transverse direction during above Process B may be kept constant or may be varied. The stretching rate is preferably 50-500%/minute, is more preferably 100-400%/minute, but is most preferably 200-300%/minute.

In view of enhancing film uniformity, in the tentering process, it is preferable that an ambient temperature distribution in the transverse direction is small. In the tentering process, the temperature distribution in the transverse direction is preferable within ±5° C., is more preferably within ±2° C., but is most preferably within ±1° C. By decreasing the above temperature distribution, it may be expected to decrease the temperature distribution along the film width.

In order to decrease crystallinity degree in Process C, it is preferable to achieve relaxation in the transverse direction. Specifically, it is preferable that the film width is regulated within the range of 95-99.5% with respect to that in the previous process.

It is preferable that after treatment via the tentering process, a post-drying process (hereinafter referred to as Process D1) is provided. Drying is carried out preferably in the range of 50-140° C., more preferably in the range of 80-140° C., but most preferably in the range of 110-130° C.

In view of enhancing film uniformity, it is preferable that in Process D1, ambient temperature distribution in the transverse direction of the film is small. It is preferably within ±5° C., is more preferably within ±2° C., but is most preferably within ±1° C.

Film conveying tension in Process D1, though affected via physical properties of the dope, the residual solvent amount at peeling and in Process Do, and the temperature during Process D1, is preferably 80-200 N/m, is more preferably 90-180 N/m, but is most preferably 100-150 N/m.

To minimize film elongation in the film conveying direction in Process D1, it is preferable to arrange a tension lowering roller. It is preferable that after drying, a slitter is arranged prior to winding and edges are cut off to enable targeted roll formation.

(Polarizing Plate)

The polarizing plate of the present invention will now be described.

It is possible to prepare a polarizing plate via common methods. The reverse surface side of the optical compensating resin film of the present invention is subjected to alkali saponification. It is preferable that the treated optical compensating resin film is adhered to at least one side of a polarizing film which is prepared by immersing a polyvinyl alcohol based film into an iodine solution followed by stretching, while employing an aqueous completely saponified type polyvinyl alcohol solution. On the other surface, employed may be the above optical compensating resin film or another polarizing plate protective film. Alternately, it is also preferable to employ commercial cellulose ester films.

As commercial cellulose ester films employed on one of the surfaces, preferably employed are KONICA MINOLTA TAC KC8UX2M, KC4UX, KC5UX, KC4UY, KC8UY, KC12UR, KC8UCR-3, KCBUCR-4, and KC8UCR-5 (all produced by Konica Minolta Opto Inc.).

"Polarizing film", as described herein, which is a major component of a polarizing plate, is an element which only transmits light of a polarized wave plane of unidirectionality. The currently known representative polarizing film is a polyvinyl alcohol based polarizing film, which includes one which is prepare by dying a polyvinyl alcohol based film with iodine, and another which is prepared by dying the same with dichroic dyes. The employed polarizing film is prepared in such a manner that a film is prepared employing an aqueous polyvinyl alcohol solution, and the resulting film is uniaxially stretched followed by dying or after dying, the resulting film is uniaxially stretched followed by a durability providing treatment preferably employing boron compounds. A polarizing plate is prepared via adhesion of one surface of the optical compensating resin film of the present invention onto the surface of the above polarizing film. The above adhesion is preferably carried out employing an aqueous adhesive in which completely saponified polyvinyl alcohol is employed as a major component.

The polarizing film is stretched in one axis direction (commonly the longitudinal direction). Consequently, when the polarizing plate is allowed to stand in an ambience of high temperature and high humidity, it is contracted in the stretching direction (commonly in the longitudinal direction, while it is elongated in the perpendicular direction (commonly the transverse direction). As the thickness of a polarizing plate protective film decreases, the elongation and contraction ratio of the polarizing plate is increased, and specifically, the elongation and contraction amount is increased in the stretching direction of the polarizing film. It is common that the stretching direction of the polarizing film is adhered to the machine direction (the MD direction) of the polarizing plate protective film. Therefore, when the thickness of the polarizing plate protective film is decreased, it is essential to control the elongation and contraction ratio in the casting direction. Since the optical compensating resin film according to the present invention significantly excels in dimensional stability, it is appropriately employed as such a polarizing plate protective film, as described above.

Namely, wavy non-uniformity is not enhanced due to a durability test at the conditions of 60° C. and 90% relative humidity. A polarizing plate, which carries a different polarizing plate protective film, results in no variation of view angle characteristics after the durability test, whereby it is possible to provide excellent visibility.

(Liquid Crystal Display Device)

By incorporating the polarizing plate of the present invention in liquid crystal display devices, it is possible to prepare various liquid crystal display devices of the present invention, which excel in visibility. The optical compensating resin film of the present invention is preferably employed in a reflection type, a transmission type, or a semi-transparent LCD, or various driving system LCD such as a TN type, an STN type, an OCB type, a HA type, a VA type (a PVA type and an MVA type), or an IPS type. Specifically, in the liquid crystal display device of a large screen of at least 30 type of the VA type, exhibited were effects which resulted in high contrast, minimal color non-uniformity and wavy non-uniformity, as well as minimal eye fatigue during viewing over an extended period.

EXAMPLES

The present invention will now be specifically described with reference to examples, however the present invention is not limited thereto.

Example 1

<<Preparation of Optical Compensating Resin Film 101>>
In Table 1, listed are employed resins, plasticizers, UV absorbers, and minute particles.

TABLE 1

| Resin | | |
|---|---|---|
| Resin | Name | Tg |
| A | polycycloolefin | 170° C. |
| B | Cellulose Ester 1 | 175° C. |
| C | Cellulose Ester 2 | 178° C. |
| D | polycarbonate | 186° C. |
| E | Cellulose Ester 3 | 163° C. |

| Plasticizer | |
|---|---|
| A | triphenyl phosphate |
| B | ethylphthalylethyl glycolate |
| C | trimethylolpropane tribenzoate |
| D | Aromatic Terminal Ester Sample No. 1 |
| E | Aromatic Terminal Ester Sample No. 13 |

| UV Absorbers | |
|---|---|
| A | TINUVIN 326 (produced by Ciba Specialty Chemical, Inc.) |
| B | TINUVIN 109 (produced by Ciba Specialty Chemical, Inc.) |
| C | TINUVIN 171 (produced by Ciba Specialty Chemical, Inc.) |
| Minute Particles | AEROSIL R972V (produced by Nippon Aerosil Co., Ltd.) |

In Table 1, with regard to Cellulose Esters 1, 2, and 3, each of the following cellulose esters was employed.

Cellulose Ester 1: cellulose acetate propionate; substitution degree of the acetyl group of 1.95, substitution degree of the propionyl group of 0.7 and substitution degree of all acyl groups of 2.65

Cellulose Ester 2: cellulose acetate propionate; substitution degree of the acetyl group of 1.8, substitution degree of the propionyl group of 0.7, and substitution degree of all acyl groups of 2.5

Cellulose Ester 3: cellulose triacetate (substitution degree of the acetyl group of 2.92)

<Minute Particle Dispersion>

| | |
|---|---|
| Minute particles | 11 parts by weight |
| Ethanol | 89 parts by weight |

The above components were blended via a dissolver for 50 minutes, followed by dispersion via a MANTON-GAULIN homogenizer.

<Minute-Particle Additive Liquid>

Resin B (cellulose ester) was added to a dissolving tank incorporating methylene chloride, followed by complete dissolution via heating. The resulting mixture was filtered via AZUMI FILTER No. 244 produced by Azumi Filterpaper Co., Ltd. While vigorously stirring the cellulose ester solution after filtration, a minute-particle dispersion was gradually added. Further, dispersion was carried out via an attritor so that the diameter of the secondary particles reached the predetermined value. The resulting dispersion was filtered via FINE MET NF, produced by Nippon Seisen Co., Ltd., whereby a minute-particle additive liquid was prepared.

| Methylene chloride | 99 parts by weight |
| Resin B (Cellulose Ester 1) | 4 parts by weight |
| Minute-particle dispersion | 11 parts by weight |

A primary dope liquid having the following composition was prepared. Initially, added were methylene chloride and ethanol into a pressurized dissolving tank. While stirring, Resin B (being cellulose ester) was fed into the pressurized dissolving tank incorporating solvents. The resulting mixture was heated while stirring to realize complete dissolution. Further, plasticizers and UV absorbers were added and dissolved. The resulting mixture was filtered via AZUMI ROSHI No. 244, produced by Azumi Filterpaper Co., Ltd., whereby a primary dope liquid was prepared.

Addition was made to reach 100 parts by weight of the primary dope liquid and 2 parts by weight of minute-particle additive liquid, and the resulting mixture was vigorously blended via an in-line mixer (Toray static type in-line mixer HI-MIXER, SWJ). Subsequently, the above blend was uniformly cast onto a 2 m wide stainless steel band support by employing a belt casting apparatus. On the stainless steel band support, solvents were evaporated to a residual solvent amount of 80%, followed by peeling from the stainless steel band. During conveyance from the peeling to the tenter, the temperature was maintained at 55° C., while the temperature distribution was maintained within ±1° C. Further, the conveying time to the following tentering apparatus was regulated to reach 100 seconds. During peeling, tension was applied to result in a longitudinal (MD) stretching factor of 1.0. Subsequently, both edges of the resulting web was held via the tenter, and stretching was carried out so that the stretching factor in the transverse direction (TD) was 1.2. The amount of the residual solvents at initiation of stretching was 15%.

Following stretching, the resulting width was maintained for several seconds. After relaxing the tension in the transverse direction, width holding was released. Further, drying was carried out in a third drying zone set at 130° C. during conveyance over 30 minutes, whereby 40 μm thick 1.5 m wide Optical Compensating Resin Film (cellulose ester film) 101 was prepared which carried knurling of a width of 1 cm and a height of 8 μm at the edges.

<Primary Dope Liquid Composition>

| Methylene chloride | 300 parts by weight |
| Ethanol | 57 parts by weight |
| Resin B (Cellulose Ester 1) | 100 parts by weight |
| Plasticizer (C) | 5.5 parts by weight |
| Plasticizer (D) | 5.5 parts by weight |

Optical Compensating Resin Films 102-104 of the present invention, and Comparative Optical Compensating Resin Films 201-205 were prepared in the same manner as above, except that the resin, plasticizer, UV absorber, drying temperatures, and stretching factor in the transverse direction were changed as listed in Table 2.

Crystallinity degree of each of the prepared optical compensating resin films was calculated based on the following calculating method. Calculated values are listed in Table 2.

(Calculation Method of Crystallinity Degree)

X-ray diffraction intensity of an optical compensating resin film sample was determined under the following Conditions, and crystallinity degree CrI was calculated based on Scheme (1). Incidentally, I8 represents 2θ=8° diffraction peak intensity, while I18 represents 2θ=18° intensity.

Diffraction peak intensity was calculated by subtracting the base line intensity from the peak intensity of each spectrum.

Figure 4:
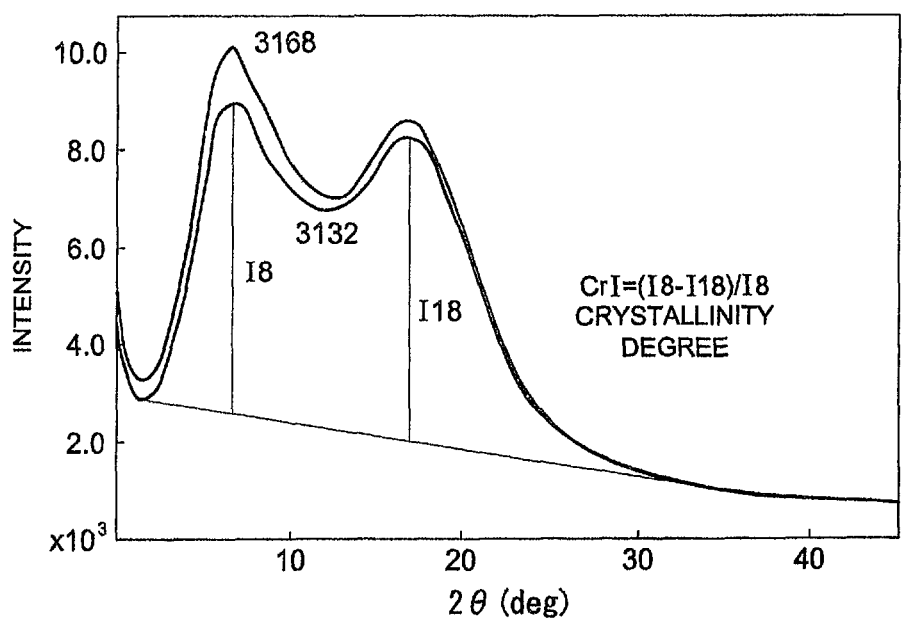
FIG. 4 is an X-ray diffraction diagram.

FIG. 4 shows an example of the X-ray diffraction diagram.

$$CrI = (I8 - I18)/I8 \quad \text{Scheme (1)}$$

X-ray generator: RINT TTR2, produced by Rigaku Corp.
X-ray source: CuKα
Output: 50 kV/300 mA
1st slit: 0.04 mm
2nd slit: 0.03 mm
Light receiving slit: 0.1 mm
<Data Recorder>
2θ/θ: continuous scanning
Measurement range: 2θ=2-45°
Sampling: 0.02°
Integrated period: 1.2 seconds

TABLE 2

| Optical Compensating Film No. | Primary Dope: Minute-Particle Additive Liquid Mixing Ratio | | Primary Dope Composition | | | | | | |
|---|---|---|---|---|---|---|---|---|---|
| | Primary Dope (parts by weight) | Minute-Particle Additive Liquid (parts by weight) | Resin | Plasticizer | | UV Absorber | | Methylene Chloride | Ethanol |
| 101 | 100 | 2 | B (100 kg) | C (5.5 kg) | D (5.5 kg) | — | — | 300 kg | 57 kg |
| 102 | 100 | 2 | C (100 kg) | C (5.5 kg) | E (5.5 kg) | — | — | 300 kg | 57 kg |
| 103 | 100 | 0 | A (100 kg) | — | — | — | — | 307 kg | 13 kg |
| 104 | 100 | 2 | B (100 kg) | C (5.5 kg) | D (5.5 kg) | — | — | 300 kg | 57 kg |

TABLE 2-continued

| | | | | | | | | | | | |
|---|---|---|---|---|---|---|---|---|---|---|---|
| 201 | 100 | 0 | D (100 kg) | — | — | — | — | — | — | 300 kg | 57 kg |
| 202 | 100 | 2 | E (100 kg) | A (9.5 kg) | B (2.2 kg) | A (0.4 kg) | B (0.7 kg) | C (0.6 kg) | | 307 kg | 13 kg |
| 203 | 100 | 2 | B (100 kg) | C (5.5 kg) | D (5.5 kg) | — | — | — | | 300 kg | 57 kg |
| 204 | 100 | 2 | B (100 kg) | C (5.5 kg) | D (5.5 kg) | — | — | — | | 300 kg | 57 kg |
| 205 | 100 | 2 | B (100 kg) | C (5.5 kg) | D (5.5 kg) | — | — | — | | 300 kg | 57 kg |

| Optical Compensating Film No. | Conveying Temperature after Peeling | Conveying Period after Peeling (seconds) | TD Stretching (factor) | Layer Thickness (μm) | Crystallinity Degree | Remarks |
|---|---|---|---|---|---|---|
| 101 | 55° C. | 100 | 1.2 | 40 | 0.06 | Present Invention |
| 102 | 50° C. | 115 | 1.25 | 40 | 0.04 | Present Invention |
| 103 | 50° C. | 90 | 1.25 | 60 | 0.05 | Present Invention |
| 104 | 55° C. | 90 | 1.2 | 40 | 0.15 | Present Invention |
| 201 | 70° C. | 90 | 1.25 | 60 | 0.35 | Comparative Example |
| 202 | 70° C. | 50 | 1.45 | 40 | 0.39 | Comparative Example |
| 203 | 55° C. | 80 | 1.2 | 40 | 0.31 | Comparative Example |
| 204 | 70° C. | 100 | 1.2 | 40 | 0.29 | Comparative Example |
| 205 | 60° C. | 120 | 1.2 | 40 | 0.16 | Comparative Example |

(Determination of Retardation Values)

Retardation values Ro and Rt of each of the prepared samples were obtained via the following formula, and listed in Table 3.

$$Ro = (nx - ny) \times d$$

$$Rt = ((nx + ny)/2 - nz) \times d$$

wherein nx, ny, and nz each represents the refractive index in the major x, y, or z axis direction of a refractive index ellipsoid, nx and ny each represents the refractive index in the in-plane direction of the aforesaid resin film, nz represents the refractive index in the thickness direction, while nx ny, and d represents the film thickness (nm).

Retardation values Ro and Rt were obtained at an ambience of 23° C. and 556 relative humility and at a wavelength of 590 nm, employing KOBRA-21ADH (produced by Oji Scientific Instruments).

TABLE 3

| Optical Compensating Film No. | Ro (nm) | Rt (nm) |
|---|---|---|
| 101 | 45 | 125 |
| 102 | 46 | 123 |
| 103 | 67 | 161 |
| 104 | 45 | 125 |
| 201 | 47 | 123 |
| 202 | 45 | 125 |
| 203 | 47 | 123 |
| 204 | 46 | 123 |
| 205 | 47 | 123 |

(Determination of Light Leakage Values)

Figure 3:
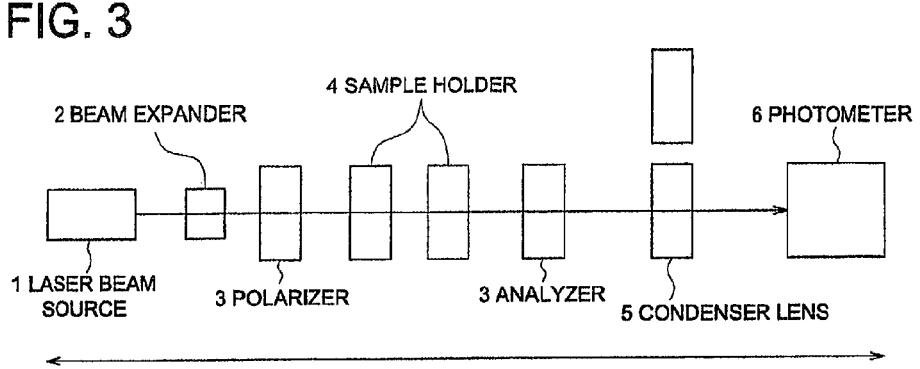
FIG. 3 is a schematic view of a light leakage evaluation apparatus.

Light leakage value of each of the prepared samples was determined via the light leakage meter shown in FIG. 3. In practice, light from a laser beam source is transmitted through a polarizer, a sample film, and an analyzer in the stated order, and the light amount is determined via a photometer, whereby the light leakage amount was determined via a black display. During the above determination, the angle of the polarizer and the analyzer was regulated to result in a minimal light amount. As the light leakage value decreases, so does the light leakage.

It is possible to obtain the light leakage value based on the following formula:

Light leakage value $P = 1 - (I/Io)$

Leaked light $I = Io \cdot \sin^2(2\theta) \cdot (\sin^2(\pi Ro/\lambda))$

Light leakage value $P = 1 - (I/Io)$ $= 1 - \{\sin^2(2\theta) \cdot \sin^2(\pi Ro/\lambda)\}$ Orientation angle $\theta = \frac{1}{2} \times A \sin [SQRT\{(I/Io)/\sin^2(\lambda Ro/\lambda)\}]$ wherein:
- Io: incident light
- θ: orientation angle
- Ro: in-plane retardation
- λ: incident light wavelength (400 nm)
- SQRT: square root <<Preparation of Polarizing Plates 101, 102, 104, and 202-205>>

A 120 μm thick polyvinyl alcohol film was uniaxially stretched (at a temperature of 110° C. and a stretching factor of 5). The resulting film was immersed for 60 seconds into an aqueous solution composed of 0.075 g of iodine, 5 g of potassium iodide, and 100 g of water, and subsequently immersed into an aqueous solution composed of 6 g of potassium iodide, 7.5 g of boric acid, and 100 g of water at 68° C. The resulting film was washed with water and dried, whereby a polarizing film was prepared.

Subsequently, in accordance with following Processes 1-5, prepared was a polarizing plate in such a manner that a polarizing film was adhered to each of above Optical Compensating Resin Films 101, 102, 104, and 202-205 and the following cellulose ester film was adhered to the rear surface as a polarizing plate protective film.

Process 1: Immersion in a 2 mol/L sodium hydroxide solution was carried out at 60° C. for 90 seconds, and subsequently, water washing and drying were carried out, whereby an optical compensating resin film was prepared which was subjected to saponification on the surface to be adhered to a polarizer.

Process 2: The above polarizing film was immersed in a solid 2% by weight polyvinyl alcohol adhesive tank for 1-2 seconds, and the resulting film was arranged on an optical compensating resin film.

Process 3: Each of Optical Compensating Resin Films 101, 102, 104, and 202-205, the polarizing film, and the rear surface of the cellulose ester film were adhered at a pressure of 20-30 N/cm$^2$, and a conveying rate of approximately 2 m/minute.

Process 4: The sample prepared in Process 3, in such a manner that the polarizing film, each of Optical Compensating Resin Films 101, 102, 104, and 202-205, and a cellulose ester film on the rear surface were adhered, was dried in a dryer at 80° C. for two minutes, whereby each of Polarizing Plates 101, 102, 104, and 202-205 was prepared.
(Preparation of Rear Surface Cellulose Ester Film)
<Minute Particle Dispersion>

| Minute particles | 11 parts by weight |
|---|---|
| Ethanol | 89 parts by weight |

After mixing the above components while stirring for 50 minutes, the resulting mixture was dispersed via a MANTON-GAULIN homogenizer.
<Minute Particle Additive Liquid>

Resin B was fed into a dissolving tank incorporating methylene chloride, followed by complete dissolution via heating. The resulting mixture was filtered via AZUMI FILTER No. 244 produced by Azumi Filterpaper Co., Ltd. While vigorously stirring the cellulose ester solution after filtration, the above minute particle dispersion was gradually added. Further, dispersion was carried out via an attritor so that the diameter of the secondary particles reached the predetermined value. The resulting dispersion was filtered via FINE MET NF, produced by Nippon Seisen Co., Ltd., whereby a minute particle additive liquid was prepared.

| Methylene chloride | 99 parts by weight |
|---|---|
| Resin E (Cellulose Ester 3) | 4 parts by weight |
| Minute particle dispersion | 11 parts by weight |

A primary dope liquid having the following composition was prepared. Initially, added to a pressurized dissolving tank were methylene chloride and ethanol. While stirring, Resin E was fed into the pressurized dissolving tank, incorporating solvents. The resulting mixture was heated while stirring to realize complete dissolution. Furthermore, plasticizers and UV absorbers were added and dissolved. The resulting mixture was filtered via AZUMI ROSHI No. 244, produced by Azumi Filterpaper co., Ltd., whereby a primary dope liquid was prepared.

Addition was made to reach 100 parts by weight of the primary dope liquid and 5 parts by weight of minute particle additive liquid, and the resulting mixture was vigorously blended via an in-line mixer (Toray static type in-line mixer HI-MIXER, SW). Subsequently, the above blend was uniformly cast onto a 2 m wide stainless steel band type support by employing a belt casting apparatus. On the stainless steel band support, solvents were evaporated to result in a residual solvent amount of 110%, followed by peeling from the stainless steel band. Stretching was carried as follows. During peeling, tension was applied to result in a machine direction (MD) stretching factor of 1.1. Subsequently, both edges of the resulting web were held via the tenter, and stretching was carried out so that the stretching factor in the transverse direction (TD) was 1.1. After stretching, the resulting width was maintained for, several seconds. After relaxing the tension in the transverse direction, width holding was released. Furthermore, drying was carried out in a third drying zone set at 125° C. during conveyance over 30 minutes, whereby a 40 μm thick 1.5 m wide cellulose ester film was prepared which carried knurling of a width of 1 cm and a height of 8 μm at the edges.
<Primary Dope Liquid Composition>

| Methylene chloride | 450 parts by weight |
|---|---|
| Ethanol | 30 parts by weigh |
| Resin E (Cellulose Ester 3) | 100 parts by weight |
| Plasticizer (C) | 2.2 parts by weight |
| Plasticizer (D) | 9.5 parts by weight |
| UV Absorber (A) | 0.4 part by weight |
| UV Absorber (B) | 0.7 part by weight |
| UV Absorber (C) | 0.6 part by weight |

<<Preparation of Polarizing Plates 103 and 201>>

A 120 μm thick polyvinyl alcohol film was uniaxially stretched (at a temperature of 110° C. and a stretching factor of 5). The resulting film was immersed for 60 seconds into an aqueous solution composed of 0.075 g of iodine, 5 g of potassium iodide, and 100 g of water, and subsequently into an aqueous solution composed of 6 g of potassium iodide, 7.5 g of boric acid, and 100 g of water at 68° C. The resulting film was washed with water and dried, whereby a polarizing film was prepared.

Subsequently, in accordance with following Processes 1-5, prepared was a polarizing plate in such a manner that a polarizing film was adhered to each of above Optical Compensating Resin Films 103 and 201 and the above cellulose ester film was adhered onto the rear surface as a polarizing plate protective film.

Process 1: The above polarizing film was coated with a silicone based adhesive at 10% solids.

Process 2: Any excessive adhesive which was adhered onto the polarizing film in Process 1 was gently wiped off, and the resulting film was arranged on the optical compensating resin film.

Process 3: Optical Compensating Films 103 and 201 laminated in Process 2, a polarizing film, and a cellulose ester film on the rear surface were adhered at a pressure of 20-30 N/cm$^2$ and a conveying rate of approximately 2 m/minute.

Process 4: The sample prepared in Process 3, in such a manner that the polarizing film, Optical Compensating Resin Films 103 and 201, and the cellulose ester film on the rear surface were adhered, was dried in a dryer at 80° C. for 2 minutes, whereby Polarizing Plates 103 and 201 were prepared.

The following reworking property of each of the resulting polarizing plates was evaluated.
(Evaluation of Reworking Property (Yield of Polarizing Plate))

The prepared polarizing plate was cut into a square of 20×20 cm, followed by adhesion onto a glass substrate employing an acrylic adhesive. Subsequently, the adhered polarizing plate was peeled from the glass from the corner via a force of 5 N. The above operation was carried out for 100 polarizing plates of one type, and the number of polarizing plates which were not completely peeled off due to cracking, and the reworking property was ranked based on the following criteria.

A: 0-5 plates
B: 6-10 plates
C: 11-15 plates
D: at least 16 plates

The reworking property of C or higher results in no practical problems, while it is preferably at the A and B levels, but is more preferably at the A level.

Table 4 shows the results.

<<Preparation of Liquid Crystal Display Devices>>

A liquid crystal panel to determine the view angle was prepared as follows, and characteristics as a liquid crystal display device were evaluated.

The polarizing plates on both sides, which were previously adhered to 32 type television BRAVIA KDL-32V1000, produced by Sony Corp., were peeled off and each of Polarizing Plates 101-104 and 202-205, prepared as above, was adhered to the glass surface of each liquid crystal cell.

During the above procedure, the adhesion direction of the polarizing plate was regulated so that the surface of above Optical Compensating Resin Films 101-104 and 201-205 was on the liquid cell side and the absorption axis was directed toward the same direction as the previously adhered polarizing plate, whereby each of Liquid Crystal display Devices 101-104 and 201-205 was prepared. Further, employed polarizing plates incorporated the edge portion which was cut from a long-length cellulose ester film, which tended to fluctuate in performance.

(Evaluation of Front Contrast)

Determination was carried out after switching on the backlight of the above liquid crystal display device for one week at an ambience of 23° C. and 55% relative humidity. EZ-CONTRAST 160D, produced by ELDIM Co., was employed for determination. Luminance from the normal line direction of the display screen of white display and black display was determined and the ratio was designated as front contrast. Under the same measurement conditions, as the value increases, the contrast is optimized, whereby it is possible to carry out relative evaluation.

Front contrast=luminance of white display determined from the normal line of a display device/luminance of black display determined from the normal line of a display device (Evaluation of Color Non-Uniformity)

In each liquid crystal display device, the screen was subjected to black display, and surface color non-uniformity was visually evaluated.

A: color non-uniformity was not noted and black looked solid
B: color non-uniformity was noted
C: color non-uniformity was significantly concerned (Evaluation of Visibility)

Each of the liquid crystal display devices, prepared as above, was allowed to stand under conditions 60° C. and 90% relative humidity for 100 hours, and thereafter, was allowed to stand at 23° C. and 55% relative humidity. As a result, when the surface of the display device was observed, one which employed the polarizing plate of the present invention excelled in flatness. On the other hand, in comparative display devices, minute wavy non-uniformity was noted, and when viewed over an extended period, eyes tended to fatigue.

A: wavy non-uniformity was not noticed on the surface
B: minute wavy non-uniformity was slightly noticed on the surface
C: minute non-uniformity was noticed on the surface

TABLE 4

| Polarizing Plate/Liquid Crystal Display Device No. | Optical Compensating Film No. | Light Leakage Value | Reworking Property | Liquid Crystal Display Device | | | Remarks |
|---|---|---|---|---|---|---|---|
| | | | | Front Contrast | Color Non-Uniformity | Visibility | |
| 101 | 101 | 23.5 | A | 710 | A | A | Present Invention |
| 102 | 102 | 23.1 | A | 725 | A | A | Present Invention |
| 103 | 103 | 23.3 | A | 715 | A | B | Present Invention |
| 104 | 104 | 24.5 | A | 700 | A | B | Present Invention |
| 201 | 201 | 26.2 | B | 640 | C | C | Comparative Example |
| 202 | 202 | 27.5 | C | 610 | B | C | Comparative Example |
| 203 | 203 | 25.8 | B | 630 | B | C | Comparative Example |
| 204 | 204 | 25.3 | C | 635 | B | C | Comparative Example |
| 205 | 205 | 24.7 | C | 665 | B | C | Comparative Example |

It is found that Compensating Resin Films 101-104 exhibit a small light leakage value due to low crystallinity degree, compared to comparative films, and excelled as an optical compensating resin film.

Table 4 shows the evaluation results of Liquid Crystal Display Devices 101-104 and 201-205. As seen form these results, it was confirmed that it was possible to provide Liquid Crystal Display Devices 101-104, employing the optical compensating resin film of the present invention, which exhibited high front contrast and excelled in flatness, color uniformity, and visibility, compared to Liquid Crystal Display Devices 201-205.

What is claimed is:

1. A method of producing an optical compensating resin film for a polarizing plate comprising the steps in the sequence set forth as follows:
    casting a resin exhibiting a glass transition temperature of 150 to 200° C. determined via DSC via a solution casting to form a film;

peeling the formed film;
conveying the film at a temperature of 55° C. or less for at least 90 seconds; and
stretching the film,
wherein the optical compensating resin film satisfies the following requirements:
Ro, defined by the formula Ro=(nx−ny)×d, is 20 to 300 nm at 23° C. and 55% relative humidity,
Rt, defined by the formula Rt=((nx+ny)/2−nz)×d, is 70 to 400 nm at 23° C. and 55% relative humidity; and
a crystallinity degree of said resin film is 0.15 or less:
wherein nx, ny, and nz each respectively represents the refractive index in the major axis x, y, and z direction of a refractive index ellipsoid, nx and ny each represents the refractive index in the in-plane direction of said resin film, nz represents the refractive index in the thickness direction, and d represents the film thickness in nm.

2. The method of producing an optical compensating resin film for a polarizing plate of claim 1,
wherein the resin used for the casting step exhibits a glass transition temperature of 170 to 185° C. determined via DSC; and
the film is kept at a temperature of 50° C. or less for at least 90 seconds in the conveying step of the film.

3. The method of producing an optical compensating resin film for a polarizing plate of claim 1,
wherein the resin employed in the optical compensating resin film is a cellulose ester.

4. The method of producing an optical compensating resin film for a polarizing plate of claim 3,
wherein the cellulose ester has an acyl group having 2 to 4 carbon atoms and simultaneously satisfies the following Formulas (I) and (II):

$$2.1 \leq X+Y \leq 2.6 \tag{I}$$

$$1.0 \leq X \leq 2.6 \tag{II}$$

wherein X represents the substitution degree of an acetyl group, and Y represents the substitution degree of a propionyl group or a butyryl group.

5. The method of producing an optical compensating resin film for a polarizing plate of claim 4,
wherein said cellulose ester is cellulose acetatee propionate.

6. The method of producing an optical compensating resin film for a polarizing plate of claim 5,
wherein the aforesaid cellulose acetate propionate satisfies the following Formulas (III) and (IV):

$$1.0 \leq X \leq 2.0 \tag{III}$$

$$0.5 \leq Y \leq 1.3 \tag{IV}$$

7. The method of producing an optical compensating resin film for a polarizing plate of claim 3,
wherein the cellulose ester incorporates a plasticizer having an aromatic terminal ester group and is represented by the following Formula (1):

$$B\text{-}(G\text{-}A)n\text{-}G\text{-}B \qquad \text{Formula (1)}$$

wherein B represents a benzene monocarboxylic acid residual group; G represents an alkylene glycol residual group having 2 to 12 carbon atoms, an aryl glycol residual group having 6 to 12 carbon atoms, or an oxyalkylene glycol residual group having 4 to 12 carbon atoms, A represents an alkylene dicarboxylic acid residual group having 4 to 12 carbon atoms or an aryl dicarboxylic acid residual group having 6 to 12 carbon atoms, and n represents an integer of 1 or more.

8. The method of producing an optical compensating resin film for a polarizing plate of claim 4,
wherein the cellulose ester incorporates a plasticizer having an aromatic terminal ester group and is represented by the following Formula (1):

$$B\text{-}(G\text{-}A)n\text{-}G\text{-}B \qquad \text{Formula (1)}$$

wherein B represents a benzene monocarboxylic acid residual group; G represents an alkylene glycol residual group having 2 to 12 carbon atoms, an aryl glycol residual group having 6 to 12 carbon atoms, or an oxyalkylene glycol residual group having 4 to 12 carbon atoms, A represents an alkylene dicarboxylic acid residual group having 4 to 12 carbon atoms or an aryl dicarboxylic acid residual group having 6 to 12 carbon atoms, and n represents an integer of 1 or more.

9. The method of producing an optical compensating resin film for a polarizing plate of claim 5,
wherein the cellulose ester incorporates a plasticizer having an aromatic terminal ester group and is represented by the following Formula (1):

$$B\text{-}(G\text{-}A)n\text{-}G\text{-}B \qquad \text{Formula (1)}$$

wherein B represents a benzene monocarboxylic acid residual group; G represents an alkylene glycol residual group having 2 to 12 carbon atoms, an aryl glycol residual group having 6 to 12 carbon atoms, or an oxyalkylene glycol residual group having 4 to 12 carbon atoms, A represents an alkylene dicarboxylic acid residual group having 4 to 12 carbon atoms or an aryl dicarboxylic acid residual group having 6 to 12 carbon atoms, and n represents an integer of 1 or more.

10. The method of producing an optical compensating resin film for a polarizing plate of claim 6,
wherein the cellulose ester incorporates a plasticizer having an aromatic terminal ester group and is represented by the following Formula (1):

$$B\text{-}(G\text{-}A)n\text{-}G\text{-}B \qquad \text{Formula (1)}$$

wherein B represents a benzene monocarboxylic acid residual group; G represents an alkylene glycol residual group having 2 to 12 carbon atoms, an aryl glycol residual group having 6 to 12 carbon atoms, or an oxyalkylene glycol residual group having 4 to 12 carbon atoms, A represents an alkylene dicarboxylic acid residual group having 4 to 12 carbon atoms or an aryl dicarboxylic acid residual group having 6 to 12 carbon atoms, and n represents an integer of 1 or more.

11. The method of producing an optical compensating resin film for a polarizing plate of claim 2,
wherein the resin employed in the optical compensating resin film is a cellulose ester.

12. The method of producing an optical compensating resin film for a polarizing plate of claim 11,
wherein the cellulose ester has an acyl group having 2 to 4 carbon atoms and simultaneously satisfies the following Formulas (I) and (II):

$$2.1 \leq X+Y \leq 2.6 \tag{I}$$

$$1.0 \leq X \leq 2.6 \tag{II}$$

wherein X represents a substitution degree of an acetyl group, and Y represents a substitution degree of a propionyl group or a butyryl group.

13. The method of producing an optical compensating resin film for a polarizing plate of claim 12, wherein said cellulose ester is cellulose acetate propionate.

14. The method of producing an optical compensating resin film for a polarizing plate of claim 13,
wherein said cellulose acetate propionate satisfies the following Formulas (III) and (IV):

$$1.0 \leq X \leq 2.0 \quad \text{(III)}$$

$$0.5 \leq Y \leq 1.3 \quad \text{(IV)}.$$

15. The method of producing an optical compensating resin film for a polarizing plate of claim 11,
wherein the cellulose ester incorporates a plasticizer having an aromatic terminal ester group and is represented by the following Formula (1):

$$B\text{-}(G\text{-}A)n\text{-}G\text{-}B \quad \text{Formula (1)}$$

wherein B represents a benzene monocarboxylic acid residual group; G represents an alkylene glycol residual group having 2 to 12 carbon atoms, an aryl glycol residual group having 6 to 12 carbon atoms, or an oxyalkylene glycol residual group having 4 to 12 carbon atoms, A represents an alkylene dicarboxylic acid residual group having 4 to 12 carbon atoms or an aryl dicarboxylic acid residual group having 6 to 12 carbon atoms, and n represents an integer of 1 or more.

16. The method of producing an optical compensating resin film for a polarizing plate of claim 12,
wherein the cellulose ester incorporates a plasticizer having an aromatic terminal ester group and is represented by the following Formula (1):

$$B\text{-}(G\text{-}A)n\text{-}G\text{-}B \quad \text{Formula (1)}$$

wherein B represents a benzene monocarboxylic acid residual group; G represents an alkylene glycol residual group having 2 to 12 carbon atoms, an aryl glycol residual group having 6 to 12 carbon atoms, or an oxyalkylene glycol residual group having 4 to 12 carbon atoms, A represents an alkylene dicarboxylic acid residual group having 4 to 12 carbon atoms or an aryl dicarboxylic acid residual group having 6 to 12 carbon atoms, and n represents an integer of 1 or more.

17. The method of producing an optical compensating resin film for a polarizing plate of claim 13,
wherein the cellulose ester incorporates a plasticizer having an aromatic terminal ester group and is represented by the following Formula (1):

$$B\text{-}(G\text{-}A)n\text{-}G\text{-}B \quad \text{Formula (1)}$$

wherein B represents a benzene monocarboxylic acid residual group; G represents an alkylene glycol residual group having 2 to 12 carbon atoms, an aryl glycol residual group having 6 to 12 carbon atoms, or an oxyalkylene glycol residual group having 4 to 12 carbon atoms, A represents an alkylene dicarboxylic acid residual group having 4 to 12 carbon atoms or an aryl dicarboxylic acid residual group having 6 to 12 carbon atoms, and n represents an integer of 1 or more.

18. The method of producing an optical compensating resin film for a polarizing plate of claim 14,
wherein the cellulose ester incorporates a plasticizer having an aromatic terminal ester group and is represented by the following Formula (1):

$$B\text{-}(G\text{-}A)n\text{-}G\text{-}B \quad \text{Formula (1)}$$

,wherein B represents a benzene monocarboxylic acid residual group; G represents an alkylene glycol residual group having 2 to 12 carbon atoms, an aryl glycol residual group having 6 to 12 carbon atoms, or an oxyalkylene glycol residual group having 4 to 12 carbon atoms, A represents an alkylene dicarboxylic acid residual group having 4 to 12 carbon atoms or an aryl dicarboxylic acid residual group having 6 to 12 carbon atoms, and n represents an integer of 1 or more.

* * * * *